United States Patent
Noureldin et al.

(10) Patent No.: US 9,803,506 B2
(45) Date of Patent: *Oct. 31, 2017

(54) POWER GENERATION FROM WASTE HEAT IN INTEGRATED CRUDE OIL HYDROCRACKING AND AROMATICS FACILITIES

(71) Applicant: Saudi Arabian Oil Company, Dhahran (SA)

(72) Inventors: Mahmoud Bahy Mahmoud Noureldin, Dhahran (SA); Hani Mohammed Al Saed, Jubail Ind. (SA); Ahmad Saleh Bunaiyan, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 15/087,412

(22) Filed: Mar. 31, 2016

(65) Prior Publication Data

US 2017/0058705 A1 Mar. 2, 2017

Related U.S. Application Data

(60) Provisional application No. 62/209,217, filed on Aug. 24, 2015, provisional application No. 62/209,147, (Continued)

(51) Int. Cl.
*F01K 25/08* (2006.01)
*F01K 13/02* (2006.01)
(Continued)

(52) U.S. Cl.
CPC .............. *F01K 13/02* (2013.01); *C10G 47/00* (2013.01); *C10G 69/00* (2013.01); *F01D 17/145* (2013.01);
(Continued)

(58) Field of Classification Search
CPC ........ C10G 69/00; C10G 47/00; F01D 17/145; F01K 13/02; H02K 7/1823
(Continued)

(56) References Cited

U.S. PATENT DOCUMENTS 3,995,428 A 12/1976 Roberts
4,024,908 A 5/1977 Meckler
(Continued)

FOREIGN PATENT DOCUMENTS

CN 1844325 10/2006
CN 101424453 5/2009
(Continued)

OTHER PUBLICATIONS

"Organic Rankine Cycle," Choice of the Working Fluid, Wikipedia, published on or before Sep. 2014, 4 pages. http://en.wikipedia.org/wiki/Organic_Rankine_cycle?oldid=628773207.
(Continued)

*Primary Examiner* — Jason Shanske
(74) *Attorney, Agent, or Firm* — Fish & Richardson P.C.

(57) ABSTRACT

A power generation system includes two heating fluid circuits coupled to multiple heat sources from multiple sub-units of a petrochemical refining system. The sub-units include an integrated hydrocracking plant and aromatics plant. A first subset and a second subset of the heat sources includes diesel hydro-treating plant heat exchangers coupled to streams in the diesel hydro-treating plant and aromatics plant heat exchangers coupled to streams in the aromatics plant, respectively. A power generation system includes an organic Rankine cycle (ORC) including a working fluid that is thermally coupled to the two heating fluid circuits to heat the working fluid, and an expander to generate electrical power from the heated working fluid. The system includes a control system to activate a set of control valves to selec-
(Continued)

tively thermally couple each heating fluid circuit to at least a portion of the heat sources.

31 Claims, 16 Drawing Sheets

Related U.S. Application Data filed on Aug. 24, 2015, provisional application No. 62/209,188, filed on Aug. 24, 2015, provisional application No. 62/209,223, filed on Aug. 24, 2015.

(51) Int. Cl.
| | |
|---|---|
| C10G 69/00 | (2006.01) |
| F01D 17/14 | (2006.01) |
| F01K 3/18 | (2006.01) |
| H02K 7/18 | (2006.01) |
| F01K 3/00 | (2006.01) |
| F01K 27/00 | (2006.01) |
| C10G 47/00 | (2006.01) |

(52) U.S. Cl.
CPC .............. *F01K 3/00* (2013.01); *F01K 3/185* (2013.01); *F01K 27/00* (2013.01); *H02K 7/1823* (2013.01); *C10G 2300/4006* (2013.01); *C10G 2400/30* (2013.01)

(58) Field of Classification Search
USPC .......................................................... 60/651
See application file for complete search history.

(56) References Cited

U.S. PATENT DOCUMENTS

| | | | |
|---|---|---|---|
| 4,109,469 | A | 8/1978 | Carson |
| 4,291,232 | A | 9/1981 | Cardone |
| 4,428,201 | A | 1/1984 | Carson |
| 4,471,619 | A | 9/1984 | Nolley, Jr. |
| 4,476,680 | A | 10/1984 | Pollman |
| 4,512,155 | A | 4/1985 | Sheinbaum |
| 4,792,390 | A | 12/1988 | Staggs |
| 4,962,238 | A | 10/1990 | Wolfe |
| 5,005,360 | A | 4/1991 | McMurtry |
| 5,007,240 | A | 4/1991 | Ishida |
| 5,164,070 | A | 11/1992 | Munro |
| 5,240,476 | A | 8/1993 | Hegarty |
| 5,497,624 | A | 3/1996 | Amir |
| 5,562,190 | A | 10/1996 | McArthur |
| 5,667,051 | A | 9/1997 | Goldberg |
| 5,685,152 | A | 11/1997 | Sterling |
| 5,740,677 | A | 4/1998 | Vestesen |
| 5,804,060 | A | 9/1998 | Benguigui et al. |
| 6,041,849 | A | 3/2000 | Karl |
| 6,733,636 | B1 | 5/2004 | Heins |
| 7,340,899 | B1 | 3/2008 | Rubak |
| 8,046,999 | B2 | 11/2011 | Doty |
| 8,529,202 | B2 | 9/2013 | Zhang |
| 9,328,634 | B2 | 5/2016 | Ikegami |
| 9,334,760 | B2 | 5/2016 | Ernst |
| 9,518,497 | B2 | 12/2016 | Tricaud |
| 9,562,201 | B2 | 2/2017 | Noureldin |
| 2006/0010872 | A1 | 1/2006 | Singh |
| 2008/0128134 | A1 | 6/2008 | Mudunuri |
| 2008/0174115 | A1 | 7/2008 | Lambirth |
| 2008/0289588 | A1 | 11/2008 | Wees et al. |
| 2008/0307789 | A1 | 12/2008 | Mak |
| 2008/0314726 | A1 | 12/2008 | Choros |
| 2009/0000299 | A1 | 1/2009 | Ast |
| 2009/0000906 | A1 | 1/2009 | Petri |
| 2009/0071652 | A1 | 3/2009 | Vinegar |
| 2009/0225929 | A1 | 9/2009 | Genta et al. |
| 2009/0287029 | A1 | 11/2009 | Anumakonda et al. |
| 2009/0301087 | A1 | 12/2009 | Borissov et al. |
| 2010/0076238 | A1 | 3/2010 | Brandvold |
| 2010/0146974 | A1 | 6/2010 | Ast |
| 2010/0242476 | A1 | 9/2010 | Ast |
| 2010/0263380 | A1 | 10/2010 | Biederman |
| 2010/0319346 | A1 | 12/2010 | Ast |
| 2010/0326076 | A1 | 12/2010 | Ast |
| 2010/0326098 | A1 | 12/2010 | Rog |
| 2011/0016863 | A1 | 1/2011 | Ernst |
| 2011/0041500 | A1 | 2/2011 | Riley |
| 2011/0072819 | A1 | 3/2011 | Silva et al. |
| 2011/0072820 | A1 | 3/2011 | Finkenrath |
| 2011/0083437 | A1 | 4/2011 | Ast |
| 2011/0158858 | A1 | 6/2011 | Alves |
| 2011/0203289 | A1 | 8/2011 | Gutierrez |
| 2011/0314844 | A1 | 12/2011 | Gu et al. |
| 2012/0000175 | A1 | 1/2012 | Wormser |
| 2012/0031096 | A1 | 2/2012 | Ulas Acikgoz et al. |
| 2012/0047889 | A1 | 3/2012 | Ulas Acikgoz et al. |
| 2012/0085095 | A1 | 4/2012 | Penton et al. |
| 2012/0085096 | A1 | 4/2012 | Penton et al. |
| 2012/0085097 | A1 | 4/2012 | Penton et al. |
| 2012/0087783 | A1 | 4/2012 | Zhang |
| 2012/0131921 | A1 | 5/2012 | Held |
| 2012/0145050 | A1 | 6/2012 | Fisenko |
| 2012/0192563 | A1 | 8/2012 | Kauffman |
| 2012/0198768 | A1 | 8/2012 | Khosravian |
| 2012/0204817 | A1 | 8/2012 | Scherffius |
| 2012/0234263 | A1 | 9/2012 | Van Wees et al. |
| 2012/0279728 | A1 | 11/2012 | Northrop |
| 2012/0279900 | A1 | 11/2012 | Noureldin et al. |
| 2012/0285169 | A1 | 11/2012 | Freund |
| 2013/0047574 | A1 | 2/2013 | Kidambi |
| 2013/0062883 | A1 | 3/2013 | Kaneeda |
| 2013/0090395 | A1 | 4/2013 | DiGenova et al. |
| 2013/0091843 | A1 | 4/2013 | Zyhowski et al. |
| 2013/0104546 | A1 | 5/2013 | Goswami |
| 2013/0145763 | A1 | 6/2013 | Mirmobin et al. |
| 2013/0165534 | A1 | 6/2013 | McComish |
| 2013/0213040 | A1 | 8/2013 | Goswami |
| 2013/0231909 | A1 | 9/2013 | Noureldin |
| 2013/0238154 | A1 | 9/2013 | Noureldin |
| 2013/0291808 | A1 | 11/2013 | Kautto |
| 2013/0334060 | A1 | 12/2013 | Koseoglu et al. |
| 2014/0090405 | A1 | 4/2014 | Held et al. |
| 2014/0174084 | A1 | 6/2014 | Kontomaris |
| 2014/0260311 | A1 | 9/2014 | Berlowitz |
| 2014/0318124 | A1 | 10/2014 | Ernst |
| 2015/0027118 | A1 | 1/2015 | Tricaud |
| 2015/0073188 | A1 | 3/2015 | Floudas |
| 2015/0361831 | A1 | 12/2015 | Myers |
| 2015/0377079 | A1 | 12/2015 | Noureldin |
| 2016/0032786 | A1 | 2/2016 | Zampieri |
| 2016/0045841 | A1 | 2/2016 | Kaplan |
| 2016/0076347 | A1 | 3/2016 | Diez |
| 2017/0058202 | A1 | 3/2017 | Noureldin |
| 2017/0058703 | A1 | 3/2017 | Noureldin |
| 2017/0058704 | A1 | 3/2017 | Noureldin |
| 2017/0058705 | A1 | 3/2017 | Noureldin |
| 2017/0058706 | A1 | 3/2017 | Noureldin |
| 2017/0058708 | A1 | 3/2017 | Noureldin |
| 2017/0058709 | A1 | 3/2017 | Noureldin |
| 2017/0058711 | A1 | 3/2017 | Noureldin |
| 2017/0058713 | A1 | 3/2017 | Noureldin |
| 2017/0058714 | A1 | 3/2017 | Noureldin |
| 2017/0058718 | A1 | 3/2017 | Noureldin |
| 2017/0058719 | A1 | 3/2017 | Noureldin |
| 2017/0058721 | A1 | 3/2017 | Noureldin |
| 2017/0058722 | A1 | 3/2017 | Noureldin |
| 2017/0058723 | A1 | 3/2017 | Noureldin |

FOREIGN PATENT DOCUMENTS

| | | |
|---|---|---|
| CN | 104560082 | 4/2015 |
| DE | 3731978 | 3/1988 |
| EP | 0292391 | 11/1988 |
| EP | 949318 | 10/1999 |
| EP | 2516326 | 10/2012 |
| FR | 2990990 | 11/2013 |
| SU | 295317 | 10/1977 |

(56) References Cited

FOREIGN PATENT DOCUMENTS

| WO | 97/21786 | 6/1997 |
| WO | 2004102082 | 11/2004 |
| WO | 2011090553 | 7/2011 |
| WO | WO2012048132 A2 | 4/2012 |
| WO | WO2013055864 A1 | 4/2013 |
| WO | 2014205163 | 12/2014 |

OTHER PUBLICATIONS

Bourji et al., "Optimizing an Organic Rankine Cycle," CEP—Chemical Engineering Progress, Jan. 2013, 6 pages.

Handayani et al., "Opportunities for Organic Rankine Cycles (ORCs) in the Process Industries," Newcastle University, Oct. 25-26, 2011, 40 pages.

Kapil et al., "Advanced Process Integration for Low Grade Heat Recovery," published on or before Mar. 2010, 58 pages.

Meacher, Organic Rankine Cycle Systems for Waste Heat Recovery in Refineries and Chemical Process Plants, Proceedings from the Third Industrial Energy Technology Conference Houston, TX, Apr. 26-29, 1981, 8 pages.

Rowshanaie et al., "Generating the Electricity from Fluegas Produced by Boiler through a ORC Thermodynamic Cycle (Organic Rankine Cycle) by using a Shaft Tightness in Turbo-Expander," International Conference on Chemical, Agricultural and Medical Sciences, Dec. 29-30, 2013, 4 pages.

Tillman, "Low Temperature Waste Energy Recovery in Chemical Plants and Refineries," TAS Energy Inc., May 16, 2012, 11 pages.

Bertrand F. Tchanche, Gr. Lambrinos, A. Frangoudakis and G. Papadakis "Low-grade heat conversion into power using organic Rankine cycles—A review of various applications", Renewable and Sustainable Energy Reviews, 15 (2011) 3963-3979 (abstract provided, full article can be provided upon request).

Jung et al., "Feasibility assessment of refinery waste heat to power conversion using an organic Rankine cycle", Energy conversion and Management, vol. 77, published in 2014, pp. 396-407.

Jose Maria Ponce-Ortega, et al., "Optimal design of inter-plant waste energy integration", Applied Thermal Engineering, 62 (2014), 633-652 (abstract provided, full article can be provided upon request).

Kevin J.DiGenova, Barbara B.Botros, and J.G. Brisson, "Method for customizing an organic Rankine cycle to a complex heat source for efficient energy conversion, demonstrated on a Fischer Tropsch plant", Applied energy, 102 (2013), 746-754 (abstract provided, full article can be provided upon request).

Hasan et al., "First and Second Law Analysis of a New Power and Refrigeration Thermodynamic Cycle using a Solar Heat Source," Pergarnon, Solar Energy, vol. 73, No. 5, Nov. 1, 2002, pp. 385-393.

Stecco, "Kalina Cycles: Some Possible Applications and Comments," Proceedings of the American Power Conference, XP 000609703, Jan. 1, 1993, vol. 1, pp. 196-201.

Tamm et al., "Theoretical and Experimental Investigation of an Ammonia-Water Power and Refrigeration Thermodynamic Cycle," Science Direct, Solar Energy, vol. 76, No. 1-3, Jan. 1, 2004, pp. 217-228.

Sadrameli et al., "Optimum Operating Conditions for a Combined Power and Cooling Thermodynamic Cycle," Science Direct, Applied Energy, vol. 84, No. 3, Nov. 10, 2006, pp. 254-265.

Vidal, "Analysis of a Combined Power and Refrigeration Cycle by the Exergy Method," Science Direct, Energy 31, Dec. 1, 2006, pp. 3401-3414.

PCT International Search Report and Written Opinion of the International Searching Authority, PCT/US2016/027417, Jul. 6, 2016, 11 pages.

PCT International Search Report and Written Opinion of the International Searching Authority, PCT/US2016/027797, Oct. 19, 2016, 12 pages.

PCT International Search Report and Written Opinion of the International Searching Authority, PCT/US2016/027794, Oct. 19, 2016, 13 pages.

PCT International Search Report and Written Opinion of the International Searching Authority, PCT/US2016/030063, Oct. 19, 2016, 13 pages.

PCT International Search Report and Written Opinion of the International Searching Authority, PCT/US2016/030156, Oct. 19, 2016, 12 pages.

PCT International Search Report and Written Opinion of the International Searching Authority, PCT/US2016/048074, Nov. 9, 2016, 12 pages.

PCT International Search Report and Written Opinion of the International Searching Authority, PCT/US2016/048042, Nov. 9, 2016, 12 pages.

PCT International Search Report and Written Opinion of the International Searching Authority, PCT/US2016/048219, Nov. 21, 2016, 13 pages.

PCT International Search Report and Written Opinion of the International Searching Authority, PCT/US2016/048229, Nov. 21, 2016, 13 pages.

PCT International Search Report and Written Opinion of the International Searching Authority, PCT/US2016/048236, Nov. 21, 2016, 13 pages.

PCT International Search Report and Written Opinion of the International Searching Authority, PCT/US2016/048067, Nov. 15, 2016, 11 pages.

PCT International Search Report and Written Opinion of the International Searching Authority, PCT/US2016/048066, Nov. 15, 2016, 11 pages.

PCT International Search Report and Written Opinion of the International Searching Authority, PCT/US2016/048078, Nov. 15, 2016, 12 pages.

PCT International Search Report and Written Opinion of the International Searching Authority, PCT/US2016/048076, Nov. 15, 2016, 12 pages.

PCT International Search Report and Written Opinion of the International Searching Authority, PCT/US2016/048207, Nov. 21, 2016, 12 pages.

PCT International Search Report and Written Opinion of the International Searching Authority, PCT/US2016/027413, Nov. 22, 2016, 11 pages.

PCT International Search Report and Written Opinion of the International Searching Authority, PCT/US2016/048063, Nov. 23, 2016, 11 pages.

PCT International Search Report and Written Opinion of the International Searching Authority, PCT/US2016/048071, Nov. 23, 2016, 11 pages.

PCT International Search Report and Written Opinion of the international Searching Authority, PCT/US2016/048210, Dec. 22, 2016, 11 pages.

PCT International Search Report and Written Opinion of the International Searching Authority, PCT/US2016/048224, Dec. 22, 2016, 11 pages.

PCT International Search Report and Written Opinion of the International Searching Authority, PCT/US2016/048209, Dec. 22, 2016, 11 pages.

PCT International Search Report and Written Opinion of the International Searching Authority, PCT/US2016/048237, Dec. 22, 2016, 11 pages.

PCT International Search Report and Written Opinion of the International Searching Authority, PCT/US2016/048223, Dec. 22, 2016, 11 pages.

PCT International Search Report and Written Opinion of the International Searching Authority, PCT/US2016/048212, Dec. 22, 2016, 11 pages.

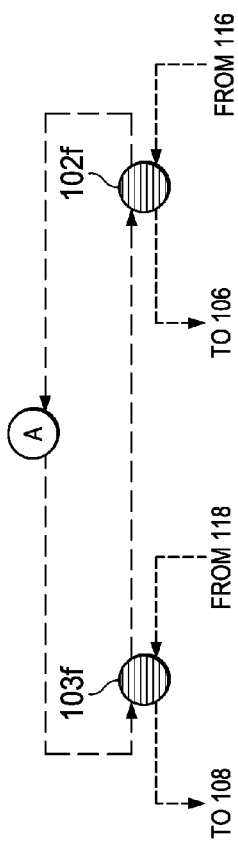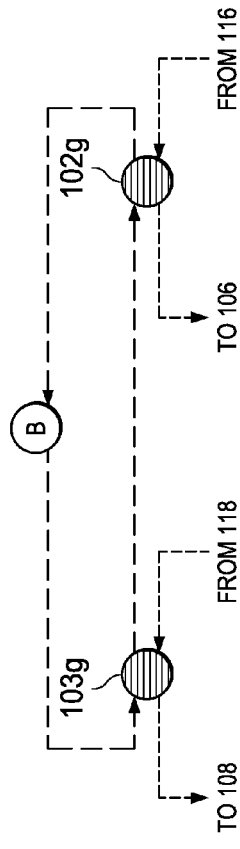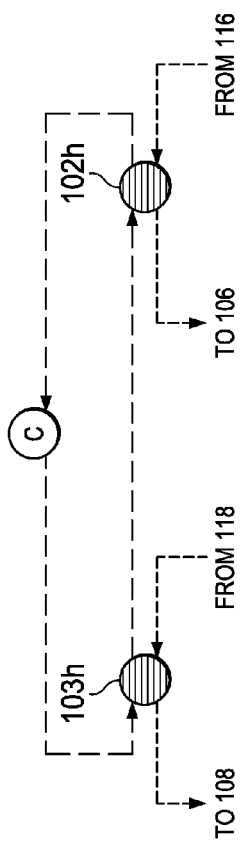

POWER GENERATION FROM WASTE HEAT IN INTEGRATED CRUDE OIL HYDROCRACKING AND AROMATICS FACILITIES

CROSS-REFERENCE TO RELATED APPLICATIONS

This application claims priority under 35 U.S.C. §119 to U.S. Provisional Patent Application Ser. No. 62/209,217, filed on Aug. 24, 2015; U.S. Provisional Patent Application Ser. No. 62/209,147, filed on Aug. 24, 2015; U.S. Provisional Patent Application Ser. No. 62/209,188, filed on Aug. 24, 2015; and U.S. Provisional Patent Application Ser. No. 62/209,223, filed on Aug. 24, 2015. The entire contents of each of the preceding applications are incorporated herein by reference in their respective entireties.

TECHNICAL FIELD

This specification relates to power generation in industrial facilities.

BACKGROUND

Petroleum refining processes are chemical engineering processes and other facilities used in petroleum refineries to transform crude oil into products, for example, liquefied petroleum gas (LPG), gasoline, kerosene, jet fuel, diesel oils, fuel oils, and other products. Petroleum refineries are large industrial complexes that involve many different processing units and auxiliary facilities, for example, utility units, storage tanks, and other auxiliary facilities. Each refinery can have its own unique arrangement and combination of refining processes determined, for example, by the refinery location, desired products, economic considerations, or other factors. The petroleum refining processes that are implemented to transform the crude oil into the products such as those listed earlier can generate heat, which may not be re-used, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to power generation from waste energy in industrial facilities. The present disclosure includes one or more of the following units of measure with their corresponding abbreviations, as shown in Table 1:

TABLE 1

| Unit of Measure | Abbreviation |
|---|---|
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |

The details of one or more implementations of the subject matter described in this specification are set forth in the accompanying drawings and the description later. Other features, aspects, and advantages of the subject matter will become apparent from the description, the drawings, and the claims.

BRIEF DESCRIPTION OF THE DRAWINGS

FIGS. 1E, 1F and 1G are schematic diagrams, each showing two heat sources in the hydrocracking plant connected in series.

DETAILED DESCRIPTION

Figure 1A:
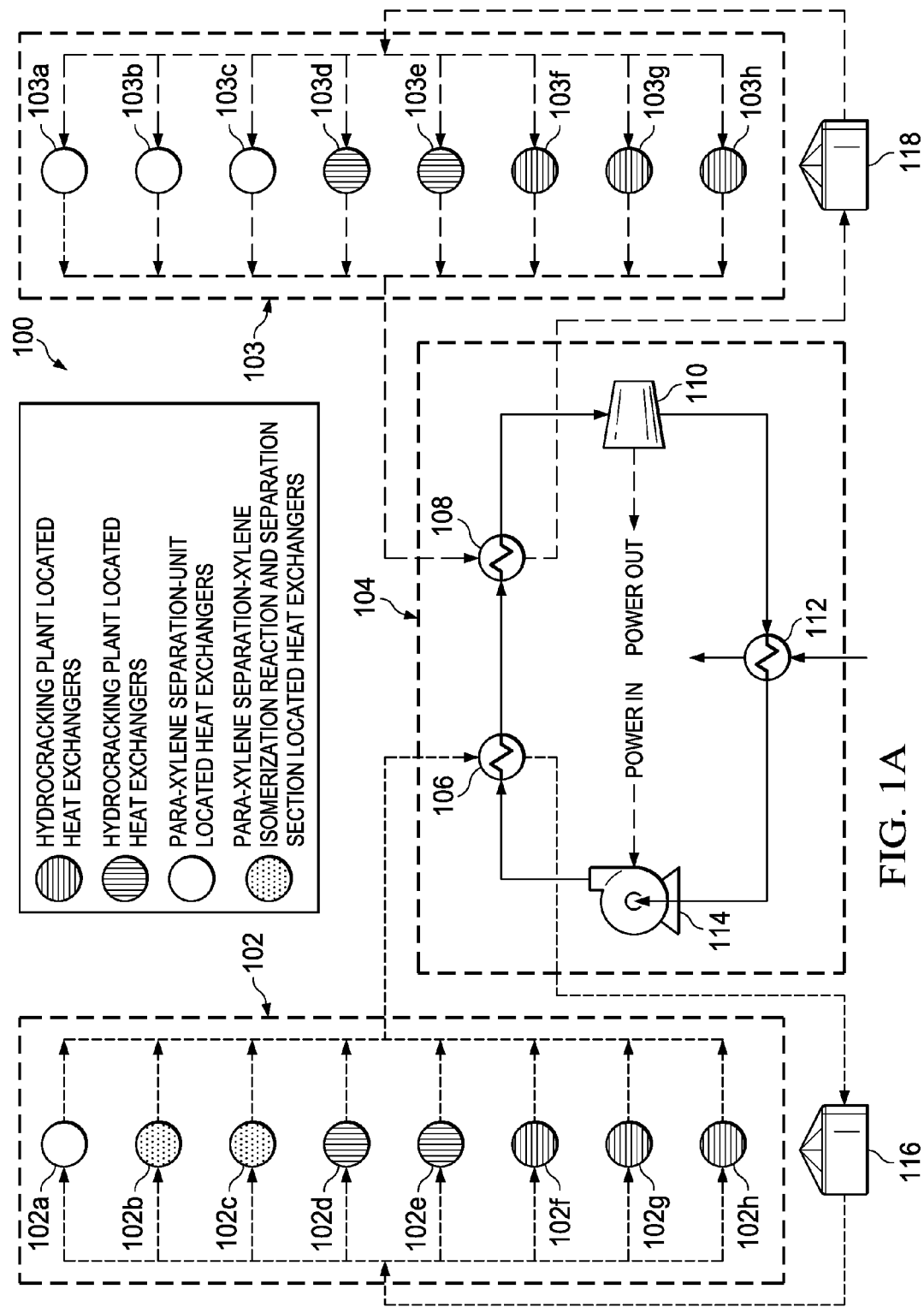
FIG. 1A is a schematic diagram of an example network to recover waste heat from sixteen heat sources.

Industrial waste heat is a source for potential carbon-free power generation in many industrial facilities, for example, crude oil refineries, petrochemical and chemical complexes, and other industrial facilities. For example, a medium-size integrated crude oil refinery with aromatics up to 4,000 MM Btu/h can be wasted to a network of air coolers extended along the crude oil and aromatics site. Some of the wasted heat can be used to power an Organic Rankine Cycle (ORC) machine, which uses an organic fluid such as refrigerants or hydrocarbons (or both) instead of water to generate power. ORC machines in combination with low temperature heat sources (for example, about or less than 232° C.) are being implemented as power generation systems. Optimizing ORC machines, for example, by optimizing the power generation cycle (that is, the Rankine cycle) or the organic fluid implemented by the ORC machine (or both), can improve power generation from recovered waste heat.

An industrial facility such as a petroleum refinery includes several sources of waste heat. One or more ORC machines can receive the waste heat from one or more or all of such sources. In some implementations, two or more sources of low grade heat can be consolidated by transferring heat from each of the sources to a common intermediate heat transfer medium (for example, water or other fluid). The intermediate heat transfer medium can then be used to evaporate the working fluid of the ORC machine to generate power, for example, to operate a turbine or other power generator. Such consolidation of sources of low grade heat can allow the ORC machine to be sized to realize greater efficiencies and economies of scale. Further, such a consolidated operation can improve flexibility in petroleum refinery design and plot space planning, since each heat source need not be in close proximity to the power generator. The proposed consolidation of heat sources, particularly, in mega sites such as a site-wide oil refinery that includes an aromatics complex and is the size of an eco-industrial park can represent an over-simplification of the problem of improving the process of recovering waste heat to generate power.

This disclosure describes optimizing power generation from waste heat, for example, low grade heat at a temperature at or less than 160° C., in large industrial facilities (for example, petroleum refineries or other large industrial refineries with several, sometimes more than 50, hot source streams) by utilizing a subset of all available hot source streams selected based, in part, on considerations for example, capital cost, ease of operation, economics of scale power generation, a number of ORC machines to be operated, operating conditions of each ORC machine, combinations of them, or other considerations. Recognizing that several subsets of hot sources can be identified from among the available hot sources in a large petroleum refinery, this disclosure describes selecting subsets of hot sources that are optimized to provide waste heat to one or more ORC machines for power generation. Further, recognizing that the utilization of waste heat from all available hot sources in a mega-site such as a petroleum refinery and aromatics complex is not necessarily or not always the best option, this disclosure identifies hot source units in petroleum refineries from which waste heat can be consolidated to power the one or more ORC machines.

This disclosure also describes modifying medium grade crude oil refining semi-conversion facilities and integrated medium grade crude oil refining semi-conversion and aromatics facilities plants' designs to improve their energy efficiencies relative to their current designs. To do so, new facilities can be designed or existing facilities can be re-designed (for example, retro-fitted with equipment) to recover waste heat, for example, low grade waste heat, from heat sources to power ORC machines. In particular, the existing design of a plant need not be significantly altered to accommodate the power generation techniques described here. The generated power can be used, in part, to power the facilities or transported to the electricity grid to be delivered elsewhere (or both).

By recovering all or part of the waste heat generated by one or more processes or facilities (or both) of industrial facilities and converting the recovered waste heat into power, carbon-free power (for example, in the form of electricity) can be generated for use by the community. The minimum approach temperature used in the waste heat recovery processes can be as low as 3° C. and the generated power can be as high as 80 MW. In some implementations, greater minimum approach temperatures can be used in an initial phase at the expense of less waste heat/energy recovery, while relatively better power generation (for example, in terms of economy of scale design and efficiency) is realized in a subsequent phase upon using the minimum approach temperature for the specific hot sources uses. In such situations, more power generation can be realized in the subsequent phase without needing to change the design topology of the initial phase or the subset of the low grade waste hot sources used in the initial phase (or both).

Not only pollution associated but also cost associated with power generation can be decreased. In addition, recovering waste heat from a customized group of hot sources to power one or more ORC machines is more optimal than recovering waste heat from all available hot sources. Selecting the hot sources in the customized group instead of or in addition to optimizing the ORC machine can improve or optimize (or both) the process of generating power from recovered waste heat. If a few number of hot sources are used for power generation, then the hot sources can be consolidated into few (for example, one or two) buffer streams using fluids, for example, hot oil or high pressure hot water system, or a mixture of the two.

In sum, this disclosure describes several petroleum refinery-wide separation/distillation networks, configurations, and processing schemes for efficient power generation using a basic ORC machine operating under specified conditions. The power generation is facilitated by obtaining all or part of waste heat, for example, low grade waste heat, carried by multiple, scattered low grade energy quality process streams. In some implementations, the ORC machine uses separate organic material to pre-heat the exchanger and evaporator and uses other organic fluid, for example, isobutane, at specific operating conditions.

Examples of Petroleum Refinery Plants

Industrial waste heat is a source for potential carbon-free power generation in many industrial facilities, for example, crude oil refineries, petrochemical and chemical complexes, and other industrial facilities. For example, a medium-size integrated crude oil refinery with aromatics up to 4,000 MM Btu/h can be wasted to a network of air coolers extended along the crude oil and aromatics site. Some of the wasted heat can be used to power an Organic Rankine Cycle (ORC) machine, which uses an organic fluid such as refrigerants or hydrocarbons (or both) instead of water to generate power. ORC machines in combination with low temperature heat sources (for example, about or less than 232° C.) are being implemented as power generation systems. Optimizing ORC machines, for example, by optimizing the power generation cycle (that is, the Rankine cycle) or the organic fluid implemented by the ORC machine (or both), can improve power generation from recovered waste heat.

An industrial facility such as a petroleum refinery includes several sources of waste heat. One or more ORC machines can receive the waste heat from one or more or all of such sources. In some implementations, two or more sources of low grade heat can be consolidated by transferring heat from each of the sources to a common intermediate heat transfer medium (for example, water or other fluid). The intermediate heat transfer medium can then be used to evaporate the working fluid of the ORC machine to generate power, for example, to operate a turbine or other power generator. Such consolidation of sources of low grade heat can allow the ORC machine to be sized to realize greater efficiencies and economies of scale. Further, such a consolidated operation can improve flexibility in petroleum refinery design and plot space planning, since each heat source need not be in close proximity to the power generator. The proposed consolidation of heat sources, particularly, in mega sites such as a site-wide oil refinery that includes an aromatics complex and is the size of an eco-industrial park can represent an over-simplification of the problem of improving the process of recovering waste heat to generate power.

This disclosure describes optimizing power generation from waste heat, for example, low grade heat at a temperature at or less than 160° C., in large industrial facilities (for example, petroleum refineries or other large industrial refineries with several, sometimes more than 50, hot source streams) by utilizing a subset of all available hot source streams selected based, in part, on considerations for example, capital cost, ease of operation, economics of scale power generation, a number of ORC machines to be operated, operating conditions of each ORC machine, combinations of them, or other considerations. Recognizing that several subsets of hot sources can be identified from among the available hot sources in a large petroleum refinery, this disclosure describes selecting subsets of hot sources that are optimized to provide waste heat to one or more ORC machines for power generation. Further, recognizing that the utilization of waste heat from all available hot sources in a mega-site such as a petroleum refinery and aromatics complex is not necessarily or not always the best option, this disclosure identifies hot source units in petroleum refineries from which waste heat can be consolidated to power the one or more ORC machines.

This disclosure also describes modifying medium grade crude oil refining semi-conversion facilities and integrated medium grade crude oil refining semi-conversion and aromatics facilities plants' designs to improve their energy efficiencies relative to their current designs. To do so, new facilities can be designed or existing facilities can be re-designed (for example, retro-fitted with equipment) to recover waste heat, for example, low grade waste heat, from heat sources to power ORC machines. In particular, the existing design of a plant need not be significantly altered to accommodate the power generation techniques described here. The generated power can be used, in part, to power the facilities or transported to the electricity grid to be delivered elsewhere (or both).

By recovering all or part of the waste heat generated by one or more processes or facilities of industrial facilities (or both) and converting the recovered waste heat into power, carbon-free power (for example, in the form of electricity) can be generated for use by the community. The minimum approach temperature used in the waste heat recovery processes can be as low as 3° C. and the generated power can be as high as 80 MW. In some implementations, greater minimum approach temperatures can be used in an initial phase at the expense of less waste heat/energy recovery, while relatively better power generation (for example, in terms of economy of scale design and efficiency) is realized in a subsequent phase upon using the minimum approach temperature for the specific hot sources uses. In such situations, more power generation can be realized in the subsequent phase without needing to change the design topology of the initial phase or the subset of the low grade waste hot sources used in the initial phase (or both).

Not only pollution associated but also cost associated with power generation can be decreased. In addition, recovering waste heat from a customized group of hot sources to power one or more ORC machines is more cost effective from a capital cost point-of-view than recovering waste heat from all available hot sources. Selecting the hot sources in the customized group instead of or in addition to optimizing the ORC machine can improve or optimize the process of generating power from recovered waste heat (or both). If a few number of hot sources are used for power generation, then the hot sources can be consolidated into few (for example, one or two) buffer streams using fluids, for example, hot oil or high pressure hot water system (or both).

In sum, this disclosure describes several petroleum refinery-wide separation/distillation networks, configurations, and processing schemes for efficient power generation using a basic ORC machine operating under specified conditions. The power generation is facilitated by obtaining all or part of waste heat, for example, low grade waste heat, carried by multiple, scattered low grade energy quality process streams. In some implementations, the ORC machine uses separate organic material to pre-heat the exchanger and evaporator and uses other organic fluid, for example, isobutane, at specific operating conditions.

Examples of Petroleum Refinery Plants

1. Hydrocracking Plant

Hydrocracking is a two-stage process combining catalytic cracking and hydrogenation. In this process heavy feedstocks are cracked in the presence of hydrogen to produce more desirable products. The process employs high pressure, high temperature, a catalyst, and hydrogen. Hydrocracking is used for feedstocks that are difficult to process by either catalytic cracking or reforming, since these feedstocks are characterized usually by high polycyclic aromatic content or high concentrations of the two principal catalyst poisons, sulfur and nitrogen compounds (or both).

The hydrocracking process depends on the nature of the feedstock and the relative rates of the two competing reactions, hydrogenation and cracking. Heavy aromatic feedstock is converted into lighter products under a wide range of high pressures and high temperatures in the presence of hydrogen and special catalysts. When the feedstock has a high paraffinic content, hydrogen prevents the formation of polycyclic aromatic compounds. Hydrogen also reduces tar formation and prevents buildup of coke on the catalyst. Hydrogenation additionally converts sulfur and nitrogen compounds present in the feedstock to hydrogen sulfide and ammonia. Hydrocracking produces isobutane for alkylation feedstock, and also performs isomerization for pour-point control and smoke-point control, both of which are important in high-quality jet fuel.

2. Diesel Hydrotreating Plant

Hydrotreating is a refinery process for reducing sulfur, nitrogen and aromatics while enhancing cetane number, density and smoke point. Hydrotreating assists the refining industry's efforts to meet the global trend for stringent clean fuels specifications, the growing demand for transportation fuels and the shift toward diesel. In this process, fresh feed is heated and mixed with hydrogen. Reactor effluent exchanges heat with the combined feed and heats recycle gas and stripper charge. Sulphide (for example, ammonium bisulphide and hydrogen sulphide) is then removed from the feed.

3. Aromatics Complex

A typical aromatics complex includes a combination of process units for the production of basic petrochemical intermediates of benzene, toluene and xylenes (BTX) using the catalytic reforming of naphtha using continuous catalyst regeneration (CCR) technology.

4. Naphtha Hydrotreating Plant and Continuous Catalytic Reformer Plants

A Naphtha Hydrotreater (NHT) produces 101 Research Octane Number (RON) reformate, with a maximum 4.0 psi Reid Vapor Pressure (RVP), as a blending stock in the gasoline pool. It usually has the flexibility to process blends of Naphtha from the Crude Unit, Gas Condensate Splitter, Hydrocracker, Light Straight-Run Naphtha (LSRN) and Visbreaker Plants. The NHT processes naphtha to produce desulfurized feed for the continuous catalyst regeneration (CCR) platformer and gasoline blending.

5. Crude Distillation Plant

Normally, a two-stage distillation plant processes various crude oils that are fractionated into different products, which are further processed in downstream facilities to produce liquefied petroleum gas (LPG), Naphtha, Motor Gasoline, Kerosene, Jet Fuel, Diesel, Fuel Oil and Asphalt. The Crude Distillation plant can typically process large volumes, for example, hundreds of thousands of barrels, of crude oil per day. During the summer months the optimum processing capacity may decrease. The plant can process mixture of crudes. The plant can also have asphalt producing facilities.

The products from crude distillation plant are LPG, stabilized whole naphtha, kerosene, diesel, heavy diesel, and vacuum residuum. The Atmospheric Column receives the crude charge and separates it into overhead product, kerosene, diesel, and reduced crude. The Naphtha stabilizer may receive the atmospheric overhead stream and separates it into LPG and stabilized naphtha. The reduced crude is charged to the Vacuum tower where it is further separated into heavy diesel, vacuum gas oils and vacuum residuum.

6. Sour Water Stripping Utility Plant (SWSUP)

The SWSUP receives sour water streams from acid gas removal, sulfur recovery, and flare units, and the sour gas stripped and released from the soot water flash vessel. The SWSUP strips the sour components, primarily carbon dioxide ($CO_2$), hydrogen sulfide ($H_2S$) and ammonia ($NH_3$), from the sour water stream.

One of more of the refinery plants described earlier can supply heat, for example, in the form of low grade waste heat, to the ORC machine with reasonable economics of scale, for example, tens of megawatts of power. Studies have shown that particular refinery plants, for example, a hydrocracking plant, serve as good waste heat sources to generate power. However, in a study using only the hot source from the naphtha hydrotreating (NHT) plant, for example, at about 111° C., 1.7 MW of power was produced from about 27.6 MW of available waste heat at a low efficiency of about 6.2%. The low efficiency suggests that a hot source from the NHT plant alone is not recommended for waste heat generation due to high capital and economy of scale. In another study using one low grade hot source at about 97° C. from a crude distillation plant, 3.5 MW of power was produced from about 64.4 MW of available waste heat at a low efficiency of 5.3%. In a further study using one low grade hot source at about 120° C. from a sour water stripping plant, 2.2 MW of power was produced from about 32.7 MW of available waste heat at a low efficiency of 6.7%. These studies reveal that if waste heat recovery from a particular refinery plant to generate power is determined to be beneficial, it does not necessarily follow that waste heat recovery from any refinery plant will also be beneficial.

In another study, all waste heat available from all hot sources (totaling 11 hot source streams) in an aromatics complex were collected to generate about 13 MW of power from about 241 MW of available waste heat. This study reveals that using all available hot sources, while theoretically efficient, does not, in practice, necessarily translate to efficient power generation from available waste heat. Moreover, assembling power plants that can use all available hot sources can be very difficult considering the quantity of heat exchangers, pumps, and organic-based turbines (among other components and inter-connectors) involved. Not only will it be difficult to retrofit existing refineries to accommodate such power plants, but it will also be difficult to build such power plants from a grass roots stage. In the following sections, this disclosure describes combinations of hot sources selected from different refinery plants which can result in high efficiencies in generating power from available waste heat.

Even after identifying specific hot sources to be used for power generation in a mega-size site, there can be several combinations of hot sources that can be integrated for optimum generation of power using a specific ORC machine operating under specific conditions. Each of the following sections describes a specific combination of hot sources and a configuration for buffer systems which can be implemented with the specific combination to optimally generate power from waste heat with as minimum capital utilization as necessary. Also, the following sections describe two-buffer systems for low grade waste heat recovery where one-buffer systems for waste heat recovery as inapplicable. Each section describes the interconnections and related processing schemes between the different plants that make up the specific combination of hot sources, the configurations including components such as heat exchangers added in specific plants, at specific places and to specific streams in the process to optimize waste heat recovery and power generation. As described later, the different configurations can be implemented without changing the current layout or processes implemented by the different plants. The new configurations described in the sections later can generate between about 34 MW and about 80 MW of power from waste heat, enabling a proportional decrease of GHG emissions in petroleum refineries. The configurations described in the sections later demonstrate more than one way to achieve desired energy recovery using buffer systems. The configurations are related processing schemes do not impact and can be integrated with future potential in-plant energy saving initiatives, for example, low pressure steam generation. The configurations and processing schemes can render more than 10% first law efficiency for power generation from the low grade waste heat into the ORC machine.

Heat Exchangers

In the configurations described in this disclosure, heat exchangers are used to transfer heat from one medium (for example, a stream flowing through a plant in a crude oil refining facility, a buffer fluid or other medium) to another medium (for example, a buffer fluid or different stream flowing through a plant in the crude oil facility). Heat exchangers are devices which transfer (exchange) heat typically from a hotter fluid stream to a relatively less hotter fluid stream. Heat exchangers can be used in heating and cooling applications, for example, in refrigerators, air conditions or other cooling applications. Heat exchangers can be distinguished from one another based on the direction in which liquids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in crude oil refining and petrochemical facilities are often shell and tube type heat exchangers which include multiple tubes through which liquid flows. The tubes are divided into two sets—the first set contains the liquid to be heated or cooled; the second set contains the liquid responsible for triggering the heat exchange, in other words, the fluid that either removes heat from the first set of tubes by absorbing and transmitting the heat away or warms the first set by transmitting its own heat to the liquid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in crude oil refining and petrochemical facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lesser the overall fluid temperature. In the adiabatic wheel heat exchanger, an intermediate liquid is used to store heat, which is then transferred to the opposite side of the heat exchanger. An adiabatic wheel consists of a large wheel with treads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a crude oil refining facility and between plants in the crude oil refining facility. The process streams can be flowed using one or more flow control systems implemented throughout the crude oil refining facility. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the crude oil refining facility, the flow control system can flow the streams within a plant or between plants under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the crude oil refining facility using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

This disclosure describes a waste heat recovery network that can be implemented to recover heat from a hydrocracking plant sub-unit and an aromatics plant sub-unit of a petrochemical refining system. As described later, heat recovered from the waste heat recovery network can be used to generate about 58 MW of power, thereby increasing a heat generation efficiency of the petrochemical refining system by about 12.3%. The waste heat recovery network described here can be implemented either in its entirety or in phases. Each phase can be separately implemented without hindering previously implemented phases or future phases. The minimum approach temperature used in the waste heat recovery network described here can be as low as 3° C. Alternatively, greater minimum approach temperatures can be used in the beginning to achieve lesser waste heat recovery. By decreasing the minimum approach temperature over time, reasonable power generation economies of scale can be used and greater power generation efficiency can be realized. Efficiency can also be increased by using a sub-set of the waste heat streams that are used in the network. The waste heat recovery network can be retrofitted to an existing petrochemical refining system layout, thereby decreasing a quantity of work needed to change the existing design topology of the petrochemical refining system.

The waste heat recovery network includes a first heating fluid circuit and a second heating fluid circuit, each thermally coupled to multiple heat sources from multiple sub-units of a petrochemical refining system. The multiple sub-units include a hydrocracking plant and an aromatics plant. The aromatics plant can include separation sections, for example, Para-Xylene separation sections, Xylene Isomerization sections, or other separation sections. The heat recovered using the waste heat recovery network can be provided to a power generation system that comprises an Organic Rankine Cycle (ORC). The design configuration of the waste heat recovery network and the processes implemented using the waste heat recovery network need not change with future efforts inside individual plants to enhance energy efficiency. The design configuration and the processes also need not be changed in response to other improvements to waste heat recovery in the petrochemical refining system.

Figure 1B:
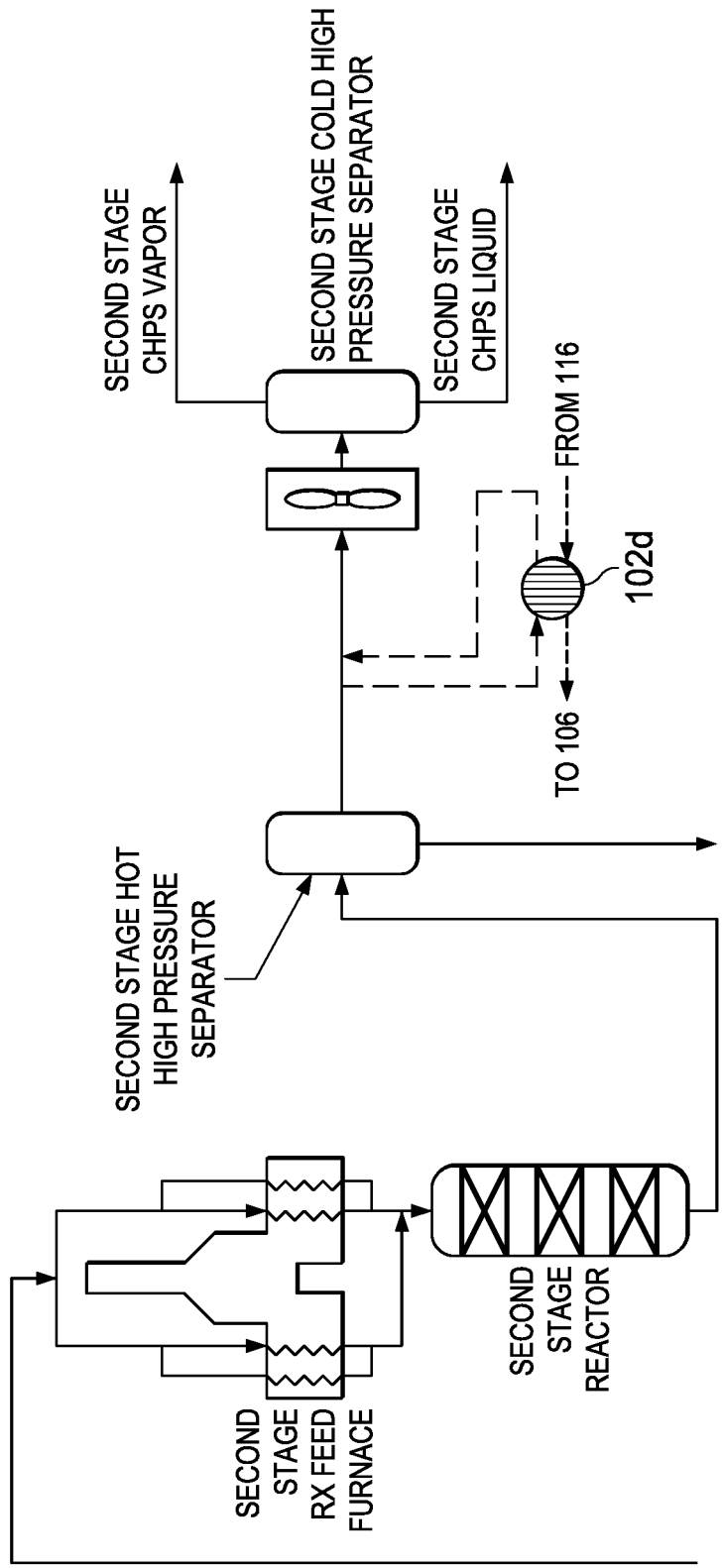
FIGS. 1B, 1C, 1DA and 1DB (collectively FIGS. 1B-1D) are schematic diagrams of heat sources in a hydrocracking plant.
Figure 1C:
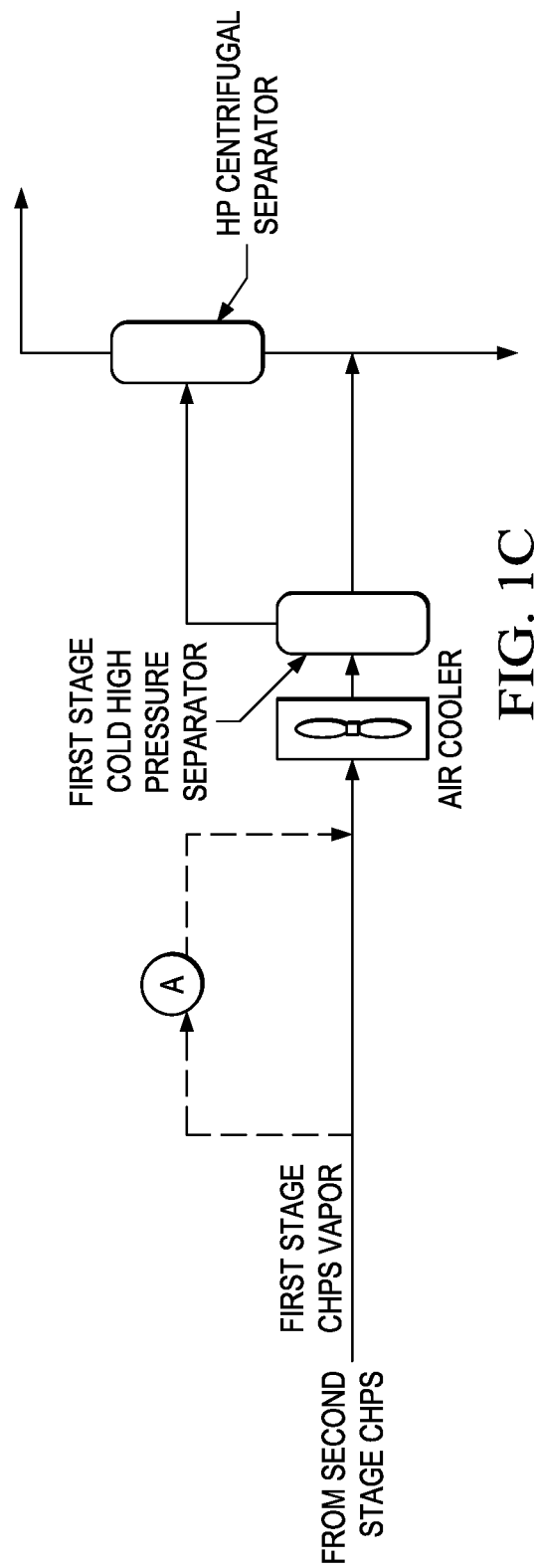
Figure 1D:
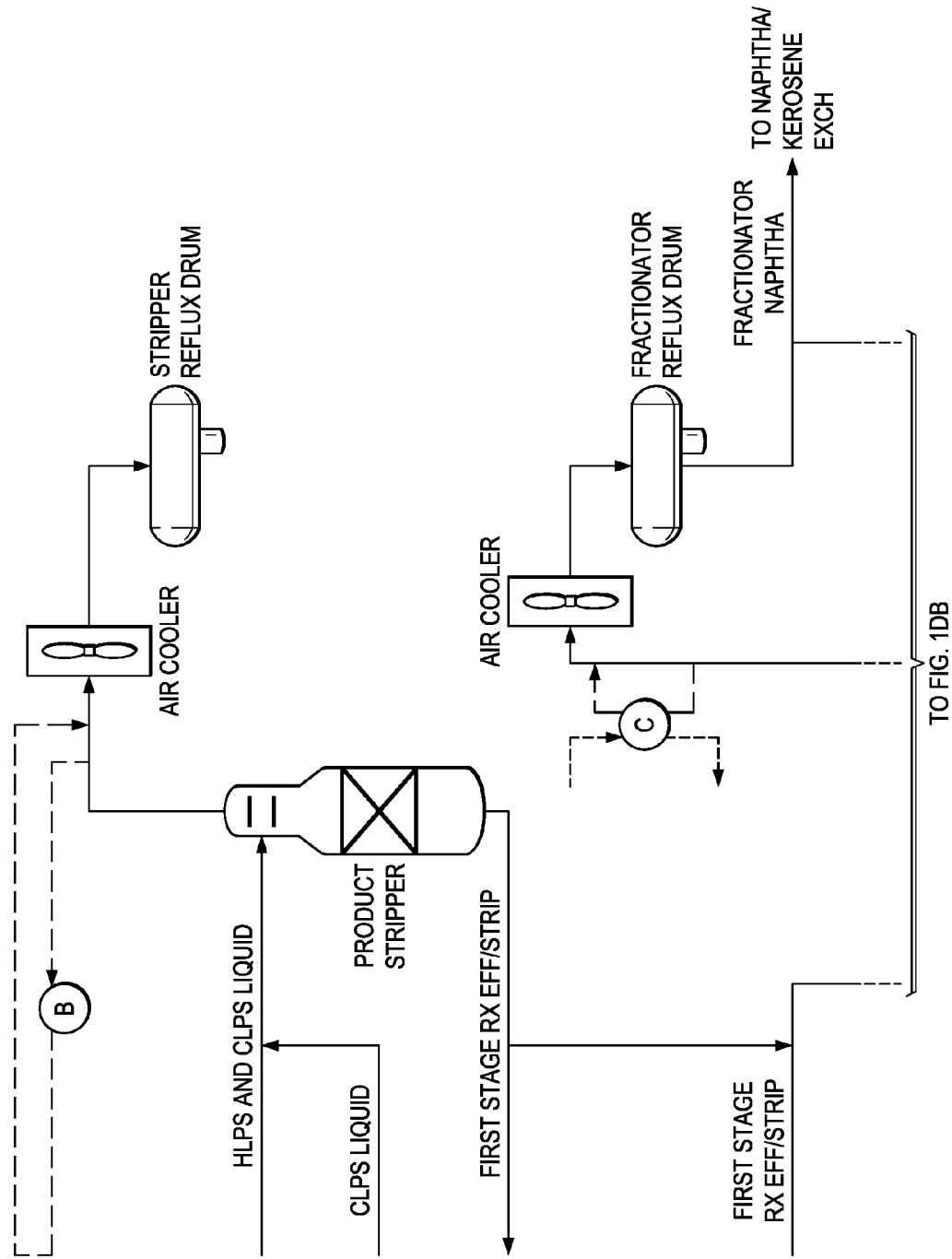
Figure 1D:
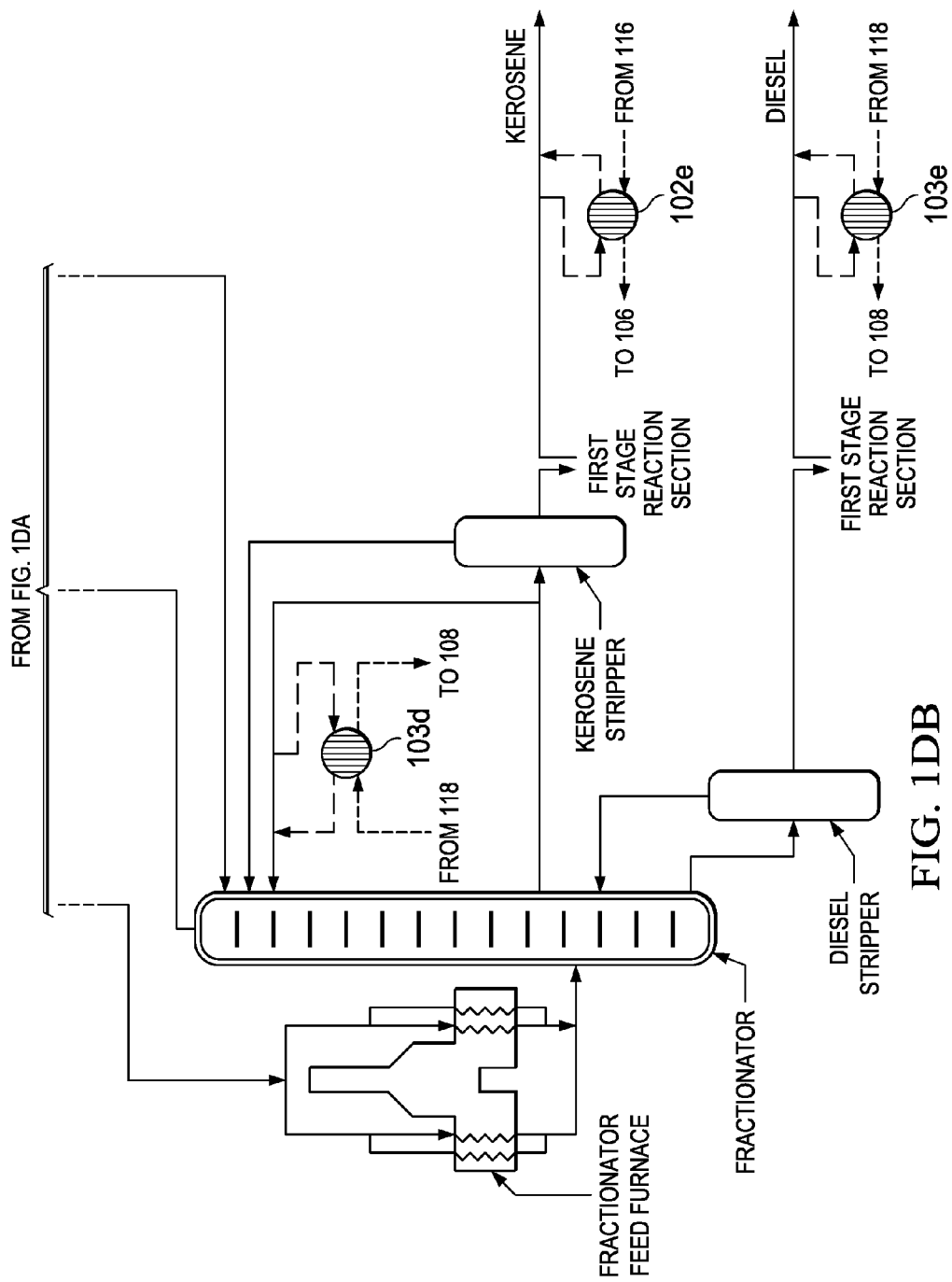

FIG. 1A is a schematic diagram of an example network to recover waste heat from sixteen heat sources. FIGS. 1B-1D are schematic diagrams of heat sources in a hydrocracking plant. Each of FIGS. 1E-1G is a schematic diagram of two heat sources in the hydrocracking plant connected in series. FIGS. 1H-1M are schematic diagrams of heat sources in an aromatics plant. FIG. 1N is a schematic diagram of an implementation of the example network of FIG. 1A.

FIG. 1A is a schematic diagram of an example network to recover waste heat from sixteen heat sources. In some implementations, the network can include a first heating fluid circuit 102 coupled to multiple heat sources. For example, the multiple heat sources can include eight heat exchangers (a first heat exchanger 102a, a second heat exchanger 102b, a third heat exchanger 102c, a fourth heat exchanger 102d, a fifth heat exchanger 102e, a sixth heat exchanger 102f, a seventh heat exchanger 102g and an eighth heat exchanger 102h). In the first heating fluid circuit 102, the first heat exchanger 102a, the second heat exchanger 102b and the third heat exchanger 102c can be coupled to an aromatics plant, specifically, to one of an extract column, a purification column overhead section, a Raffinate column overhead section, a heavy reformate splitter, a para-Xylene reaction section or a de-heptanizer of the aromatics plant. In the first heating fluid circuit 102, the fourth heat exchanger 102d, the fifth heat exchanger 102e, the sixth heat exchanger 102f, the seventh heat exchanger 102g and the eighth heat exchanger 102h can be coupled to the hydrocracking plant. The six heat sources in the first heating fluid circuit 102 can be connected in parallel.

The network can include a second heating fluid circuit 103 coupled to multiple heat sources. For example, the multiple heat sources can include eight heat exchangers (a first heat exchanger 103a, a second heat exchanger 103b, a third heat exchanger 103c, a fourth heat exchanger 103d, a fifth heat exchanger 103e, a sixth heat exchanger 103f, a seventh heat exchanger 103g, and an eighth heat exchanger 103h). In the second heating fluid circuit 103, the first heat exchanger 103a, the second heat exchanger 103b and the third heat exchanger 103c can be coupled to the aromatics plant. In the second heating fluid circuit 103, the fourth heat exchanger 103d, the fifth heat exchanger 103e, the sixth heat exchanger 103f, the seventh heat exchanger 103g and the eighth heat exchanger 103h can be coupled to the hydrocracking plant. The four heat sources in the second heating fluid circuit 103 can be connected in parallel. Also, as described later, the sixth heat exchanger 102f in the first heating fluid circuit 102 and the sixth heat exchanger 103f in the second heating fluid circuit 103 can be connected in series. Similarly, the seventh heat exchanger 102g in the first heating fluid circuit 102 and the seventh heat exchanger 103g in the second heating fluid circuit 103 can be connected in series. Also, the eighth heat exchanger 102h in the first heating fluid circuit 102 and the eighth heat exchanger 103h in the second heating fluid circuit 103 can be connected in series.

The example network can include a power generation system 104 that includes an organic Rankine cycle (ORC). The ORC can include a working fluid that is thermally coupled to the first heating fluid circuit 102 and the second heating fluid circuit 103 to heat the working fluid. In some implementations, the working fluid can be isobutane. The ORC can include a gas expander 110 configured to generate electrical power from the heated working fluid. As shown in FIG. 1A, the ORC can additionally include an evaporator 108, a pump 114, a condenser 112 and a pre-heater 106. In some implementations, the working fluid can be thermally coupled to the first heating fluid circuit 102 in the pre-heater 106, and to the second heating fluid in the evaporator 108.

In operation, a heating fluid (for example, water, oil, or other fluid) is circulated through the eight heat exchangers in the first heating fluid circuit 102 and the eight heat exchangers in the second heating fluid circuit 103. An inlet temperature of the heating fluid that is circulated into the inlets of each of the eight heat sources in the first heating fluid circuit 102 is the same or substantially the same subject to any temperature variations that may result as the heating fluid flows through respective inlets. Similarly, an inlet temperature of the heating fluid that is circulated into the inlets of the each of the eight heat sources in the second heating fluid circuit 103 is the same or substantially the same subject to any temperature variations that may result as the heating fluid flows through respective inlets. Each heat exchanger in each heating fluid circuit heats the heating fluid to a respective temperature that is greater than the respective inlet temperature. The heated heating fluids from the eight heat exchangers in the first heating fluid circuit 102 are combined and flowed through the pre-heater 106 of the ORC. The heated heating fluids from the eight heat exchangers in the second heating fluid circuit 103 are combined and flowed through the evaporator 108 of the ORC. The heating fluid flowed through the pre-heater 106 is then collected in a heating fluid tank 116 and can be pumped back through the eight heat exchangers in the first heating fluid circuit 102 to restart the waste heat recovery cycle. Similarly, the heating fluid flowed through the evaporator 108 is then collected in a heating fluid tank 118 and can be pumped back through the eight heat exchangers in the second heating fluid circuit 103 to restart the waste heat recovery cycle. In some implementations, the heating fluid that exits the pre-heater 106 or the heating fluid that exits the evaporator 108 (or both) can be flowed through a respective air cooler (not shown) to further cool the heating fluid before the heating fluid is collected in the respective heating fluid tank.

In the manner described earlier, the heating fluid can be looped through the sixteen heat exchangers distributed across the two heating fluid circuits to recover heat that would otherwise go to waste in the hydrocracking plant and the aromatics plant, and to use the recovered waste heat to operate the power generation system. By doing so, an amount of energy needed to operate the power generation system can be decreased while obtaining the same or substantially similar power output from the power generation system. For example, the power output from the power generation system that implements the waste heat recovery network can be greater or lesser than the power output from the power generation system that does not implement the waste heat recovery network. Where the power output is less, the difference may not be statistically significant. Consequently, a power generation efficiency of the petrochemical refining system can be increased.

FIGS. 1B-1D are schematic diagrams of heat sources in a hydrocracking plant. FIG. 1B shows the fourth heat exchanger 102d in the first heating fluid circuit 102 in the hydrocracking plant of the petrochemical refining system. A feed stream from a hydrocracking $2^{nd}$ stage reaction section feed to $2^{nd}$ stage cold high pressure separator and the heating fluid flow through the fourth heat exchanger 102d simultaneously. The fourth heat exchanger 102d cools down the stream from a greater temperature, for example, about 157° C., to a lesser temperature, for example, about 60° C., and increases the temperature of the heating fluid from a lesser temperature, for example, about 50° C., to a greater temperature, for example, about 152° C. The thermal duty of the fourth heat exchanger 102d to implement the heat exchange is about 26 MW. The heating fluid at about 152° C. that exits the fourth heat exchanger 102d is circulated to a main heater to be mixed with the heated heating fluids from the other seven heat exchangers in the first heating fluid circuit 102.

FIG. 1C shows a combination of the sixth heat exchanger 102f in the first heating fluid circuit 102 and the sixth heat exchanger 103f in the second heating fluid circuit 103. As shown in FIG. 1E, the sixth heat exchanger 102f and the sixth heat exchanger 103f are connected in series. A stream from a hydrocracking $1^{st}$ stage reaction section feed to $1^{st}$ stage cold high pressure separator flows through the sixth heat exchanger 103f in the second heating fluid circuit 103 simultaneously with a portion of the heating fluid from the second heating fluid circuit 103. The sixth heat exchanger 103f cools down the stream from a greater temperature, for example, about 159° C., to a lesser temperature, for example, about 115° C., and increases the temperature of the heating fluid from a lesser temperature, for example, about 105° C., to a greater temperature, for example, about 154° C. The thermal duty of the sixth heat exchanger 103f to implement the heat exchange is about 36 MW. The heating fluid at about 154° C. that exits the sixth heat exchanger 103f is circulated to a main heater to be mixed with the heated heating fluids from the other seven heat exchangers in the second heating fluid circuit 103. The stream from the hydrocracking $1^{st}$ stage reaction section feed to $1^{st}$ stage cold high pressure separator that exits the sixth heat exchanger 103f, then flows into the sixth heat exchanger 102f in the first heating fluid circuit 102 simultaneously with a portion of the heating fluid from the first heating fluid circuit 102. The sixth heat exchanger 102f cools down the stream from a greater temperature, for example, about 115° C., to a lesser temperature, for example, about 60° C., and increases the temperature of the heating fluid from a lesser temperature, for example, about 50° C., to a greater temperature, for example, about 510° C. The thermal duty of the sixth heat exchanger 102f to implement the heat exchange is about 45 MW. The heating fluid at about 110° C. that exits the sixth heat exchanger 102f is circulated to a main heater to be mixed with the heated heating fluids from the other seven heat exchangers in the first heating fluid circuit 102.

FIG. 1D shows a combination of the seventh heat exchanger 102g in the first heating fluid circuit 102 and the seventh heat exchanger 103g in the second heating fluid circuit 103. As shown in FIG. 1F, the seventh heat exchanger 102g and the seventh heat exchanger 103g are connected in series. A stream from a hydrocracking product stripper overhead flows through the seventh heat exchanger 103g in the second heating fluid circuit 103 simultaneously with a portion of the heating fluid from the second heating fluid circuit 103. The seventh heat exchanger 103g cools down the stream from a greater temperature, for example, about 169° C., to a lesser temperature, for example, about 115° C., and increases the temperature of the heating fluid from a lesser temperature, for example, about 105° C., to a greater temperature, for example, about 164° C. The thermal duty of the seventh heat exchanger 103g to implement the heat exchange is about 19 MW. The heating fluid at about 164° C. that exits the seventh heat exchanger 103g is circulated to a main heater to be mixed with the heated heating fluids from the other seven heat exchangers in the second heating fluid circuit 103. The stream from the hydrocracking $1^{st}$ stage reaction section feed to $1^{st}$ stage cold high pressure separator that exits the seventh heat exchanger 103g, then flows into the seventh heat exchanger 102g in the first heating fluid circuit 102 simultaneously with a portion of the heating fluid from the first heating fluid circuit 102. The seventh heat exchanger 102g cools down the stream from a greater temperature, for example, about 115° C., to a lesser temperature, for example, about 60° C., and increases the temperature of the heating fluid from a lesser temperature, for example, about 50° C., to a greater temperature, for example, about 110° C. The thermal duty of the seventh heat exchanger 102g to implement the heat exchange is about 18 MW. The heating fluid at about 110° C. that exits the seventh heat exchanger 102g is circulated to a main heater to be mixed with the heated heating fluids from the other seven heat exchangers in the first heating fluid circuit 102.

FIG. 1D also shows a combination of the eighth heat exchanger 102h in the first heating fluid circuit 102 and the eighth heat exchanger 103h in the second heating fluid circuit 103. As shown in FIG. 1G, the eighth heat exchanger 102h and the eighth heat exchanger 103h are connected in series. A stream from a hydrocracking main fractionator overhead flows through the eighth heat exchanger 103h in the second heating fluid circuit 103 simultaneously with a portion of the heating fluid from the second heating fluid circuit 103. The eighth heat exchanger 103h cools down the stream from a greater temperature, for example, about 136° C., to a lesser temperature, for example, about 118° C., and increases the temperature of the heating fluid from a lesser temperature, for example, about 105° C., to a greater temperature, for example, about 131° C. The thermal duty of the eighth heat exchanger 103h to implement the heat exchange is about 21 MW. The heating fluid at about 131° C. that exits the eighth heat exchanger 103h is circulated to a main heater to be mixed with the heated heating fluids from the other seven heat exchangers in the second heating fluid circuit 103. The stream from the hydrocracking $1^{st}$ stage reaction section feed to $1^{st}$ stage cold high pressure separator that exits the eighth heat exchanger 103h, then flows into the eighth heat exchanger 102h in the first heating fluid circuit 102 simultaneously with a portion of the heating fluid from the first heating fluid circuit 102. The eighth heat exchanger 102h cools down the stream from a greater temperature, for example, about 118° C., to a lesser temperature, for example, about 60° C., and increases the temperature of the heating fluid from a lesser temperature, for example, about 50° C., to a greater temperature, for example, about 113° C. The thermal duty of the eighth heat exchanger 102h to implement the heat exchange is about 68 MW. The heating fluid at about 113° C. that exits the eighth heat exchanger 102h is circulated to a main heater to be mixed with the heated heating fluids from the other seven heat exchangers in the first heating fluid circuit 102.

FIG. 1D further shows the fourth heat exchanger 103d in the second heating fluid circuit 103 in the hydrocracking plant of the petrochemical refining system. A feed stream from a hydrocracking main fractionator kerosene pump-around and the heating fluid flow through the fourth heat exchanger 103d simultaneously. The fourth heat exchanger 103d cools down the stream from a greater temperature, for example, about 160° C., to a lesser temperature, for example, about 130° C., and increases the temperature of the heating fluid from a lesser temperature, for example, about 105° C., to a greater temperature, for example, about 155° C. The thermal duty of the fourth heat exchanger 103d to implement the heat exchange is about 6 MW. The heating fluid at about 155° C. that exits the fourth heat exchanger 103d is circulated to a main heater to be mixed with the heated heating fluids from the other seven heat exchangers in the second heating fluid circuit 103.

FIG. 1D also shows the fifth heat exchanger 102e in the first heating fluid circuit 102 in the hydrocracking plant of the petrochemical refining system. A feed stream from a hydrocracking main fractionator kerosene product and the heating fluid flow through the fifth heat exchanger 102e simultaneously. The fifth heat exchanger 102e cools down the stream from a greater temperature, for example, about 160° C., to a lesser temperature, for example, about 60° C., and increases the temperature of the heating fluid from a lesser temperature, for example, about 50° C., to a greater temperature, for example, about 155° C. The thermal duty of the fifth heat exchanger 102e to implement the heat exchange is about 20 MW. The heating fluid at about 155° C. that exits the fifth heat exchanger 102e is circulated to a main heater to be mixed with the heated heating fluids from the other seven heat exchangers in the first heating fluid circuit 102.

FIG. 1D additionally shows the fifth heat exchanger 103e in the second heating fluid circuit 103 in the hydrocracking plant of the petrochemical refining system. A feed stream from a hydrocracking main fractionator diesel product and the heating fluid flow through the fifth heat exchanger 103e simultaneously. The fifth heat exchanger 103e cools down the stream from a greater temperature, for example, about 160° C., to a lesser temperature, for example, about 121° C., and increases the temperature of the heating fluid from a lesser temperature, for example, about 105° C., to a greater temperature, for example, about 155° C. The thermal duty of the fifth heat exchanger 103e to implement the heat exchange is about 6 MW. The heating fluid at about 155° C. that exits the fifth heat exchanger 103e is circulated to a main heater to be mixed with the heated heating fluids from the other seven heat exchangers in the second heating fluid circuit 103.

Figure 1H:
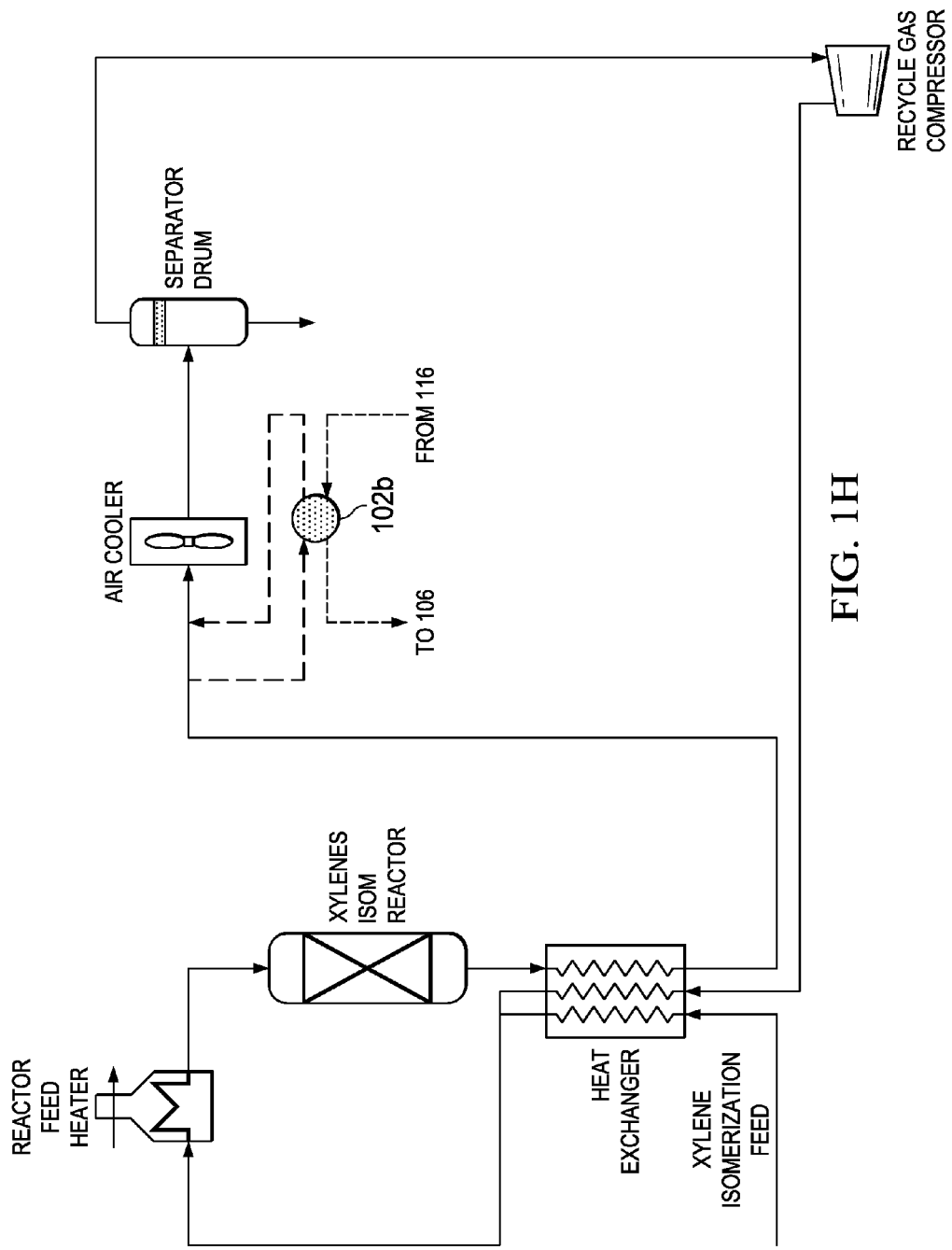
FIGS. 1H-1M are schematic diagrams of heat sources in an aromatics plant.

FIGS. 1H-1K are schematic diagrams of heat sources in an aromatics plant. FIG. 1H shows the second heat exchanger 102b in the first heating fluid circuit 102 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from a Xylene isomerization reactor outlet before the separator drum and the heating fluid flow through the second heat exchanger 102b simultaneously. The second heat exchanger 102b cools down the stream from a greater temperature, for example, about 114° C., to a lesser temperature, for example, about 60° C., and increases the temperature of the heating fluid from a lesser temperature, for example, about 50° C., to a greater temperature, for example, about 109° C. The thermal duty of the second heat exchanger 102b to implement the heat exchange is about 16 MW. The heating fluid at about 109° C. that exits the second heat exchanger 102b is circulated to a main heater to be mixed with the heated heating fluids from the other seven heat exchangers in the first heating fluid circuit 102.

Figure 1I:
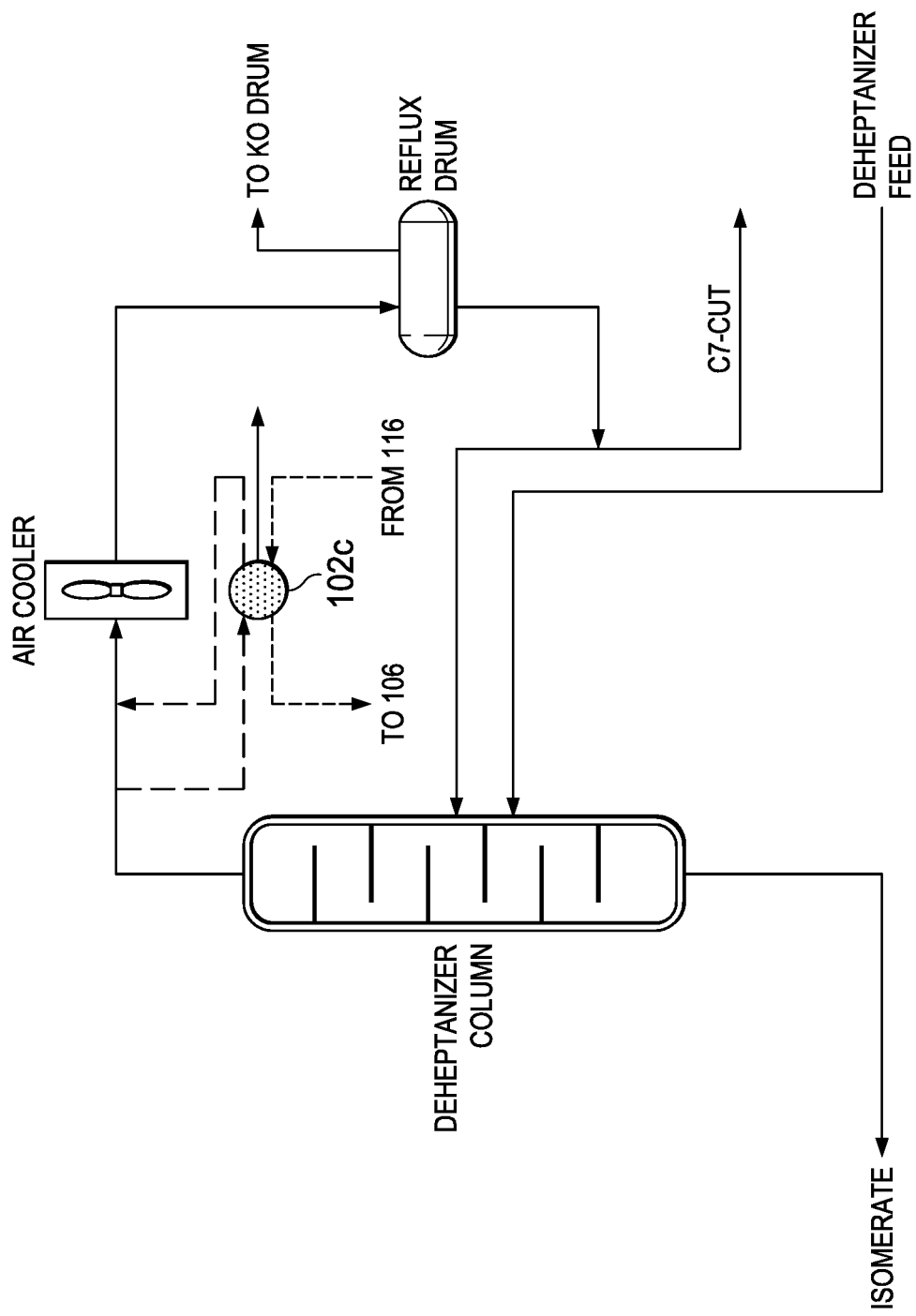

FIG. 1I shows the third heat exchanger 102c in the first heating fluid circuit 102 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from a Xylene isomerization de-heptanizer and the heating fluid flow through the third heat exchanger 102c simultaneously. The third heat exchanger 102c cools down the stream from a greater temperature, for example, about 112° C., to a lesser temperature, for example, about 60° C., and increases the temperature of the heating fluid from a lesser temperature, for example, about 50° C., to a greater temperature, for example, about 107° C. The thermal duty of the third heat exchanger 102c to implement the heat exchange is about 21 MW. The heating fluid at about 107° C. that exits the third heat exchanger 102c is circulated to a main heater to be mixed with the heated heating fluids from the other seven heat exchangers in the first heating fluid circuit 102.

Figure 1J:
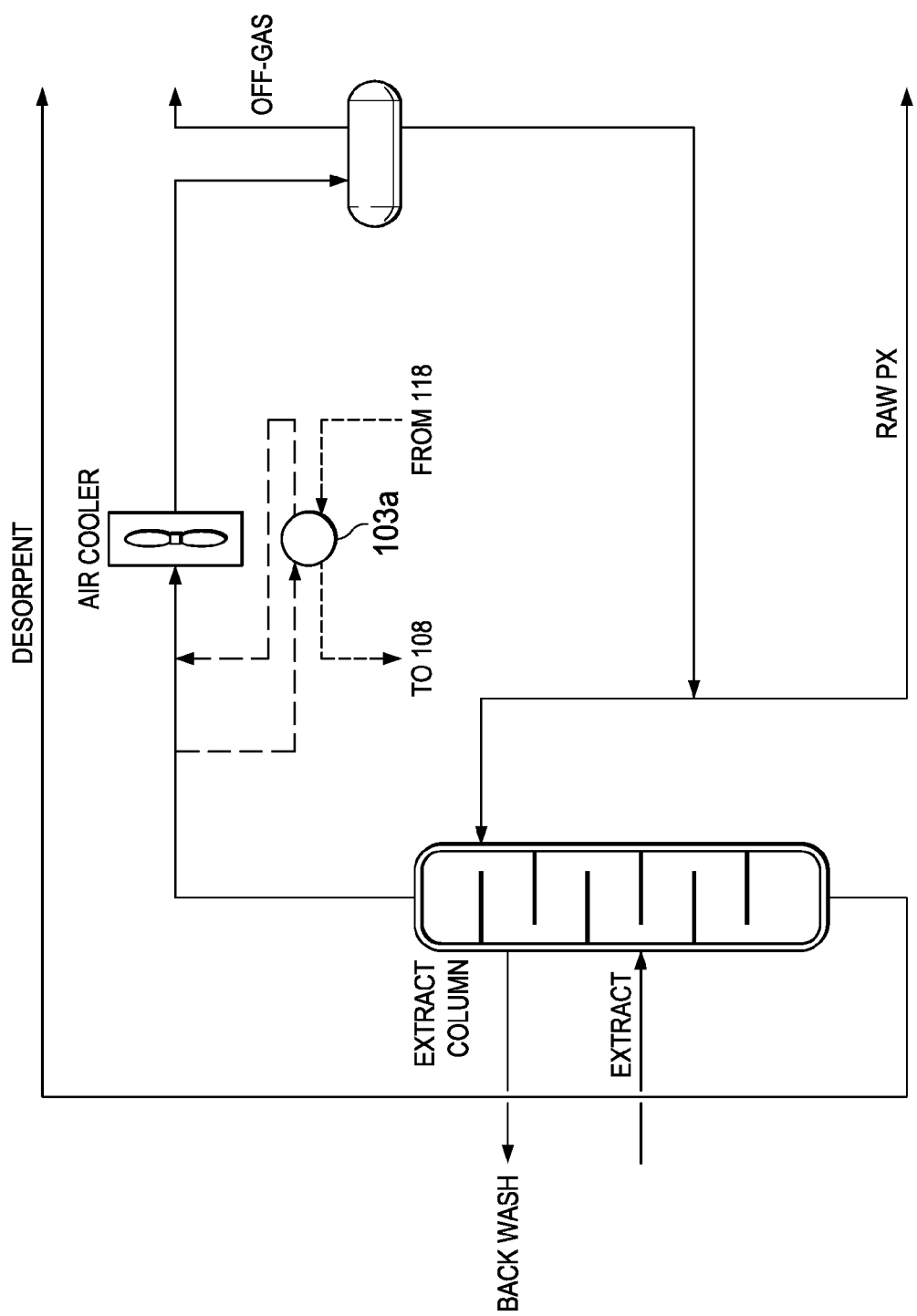

FIG. 1J shows the first heat exchanger 103a in the second heating fluid circuit 103 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from an extract column overhead and the heating fluid flow through the first heat exchanger 103a simultaneously. The first heat exchanger 103a cools down the stream from a greater temperature, for example, about 156° C., to a lesser temperature, for example, about 133° C., and increases the temperature of the heating fluid from a lesser temperature, for example, about 105° C., to a greater temperature, for example, about 151° C. The thermal duty of the first heat exchanger 103a to implement the heat exchange is about 33 MW. The heating fluid at about 151° C. that exits the first heat exchanger 103a is circulated to a main heater to be mixed with the heated heating fluids from the other seven heat exchangers in the second heating fluid circuit 103.

Figure 1K:
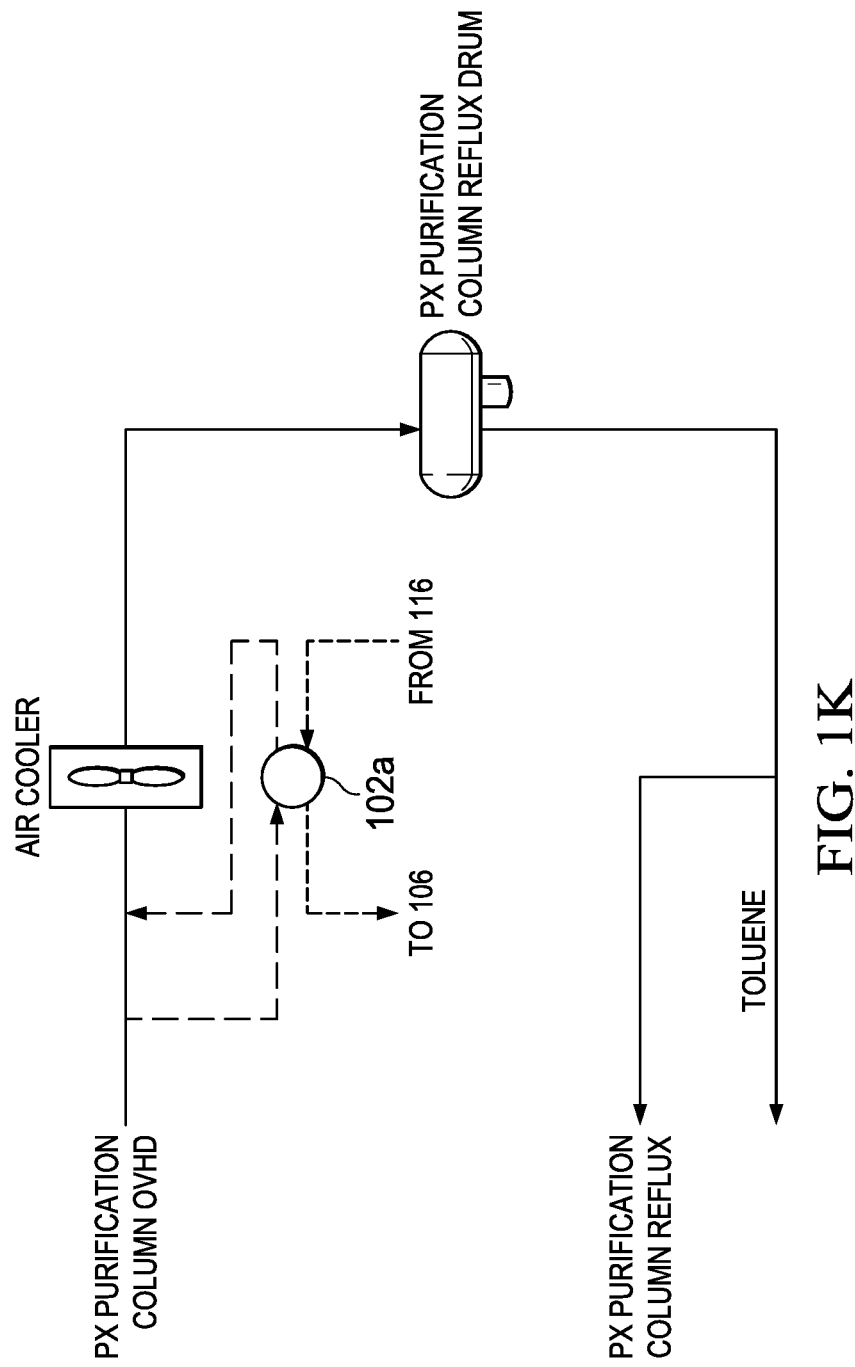

FIG. 1K shows the first heat exchanger 102a in the first heating fluid circuit 102 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from the para-Xylene purification column overhead and the heating fluid flow through the first heat exchanger 102a simultaneously. The first heat exchanger 102a cools down the stream from a greater temperature, for example, about 127° C., to a lesser temperature, for example, about 84° C., and increases the temperature of the heating fluid from a lesser temperature, for example, about 50° C., to a greater temperature, for example, about 122° C. The thermal duty of the first heat exchanger 102a to implement the heat exchange is about 14 MW. The heating fluid at about 122° C. that exits the first heat exchanger 102a is circulated to a main heater to be mixed with the heated heating fluids from the other seven heat exchangers in the first heating fluid circuit 102.

Figure 1L:
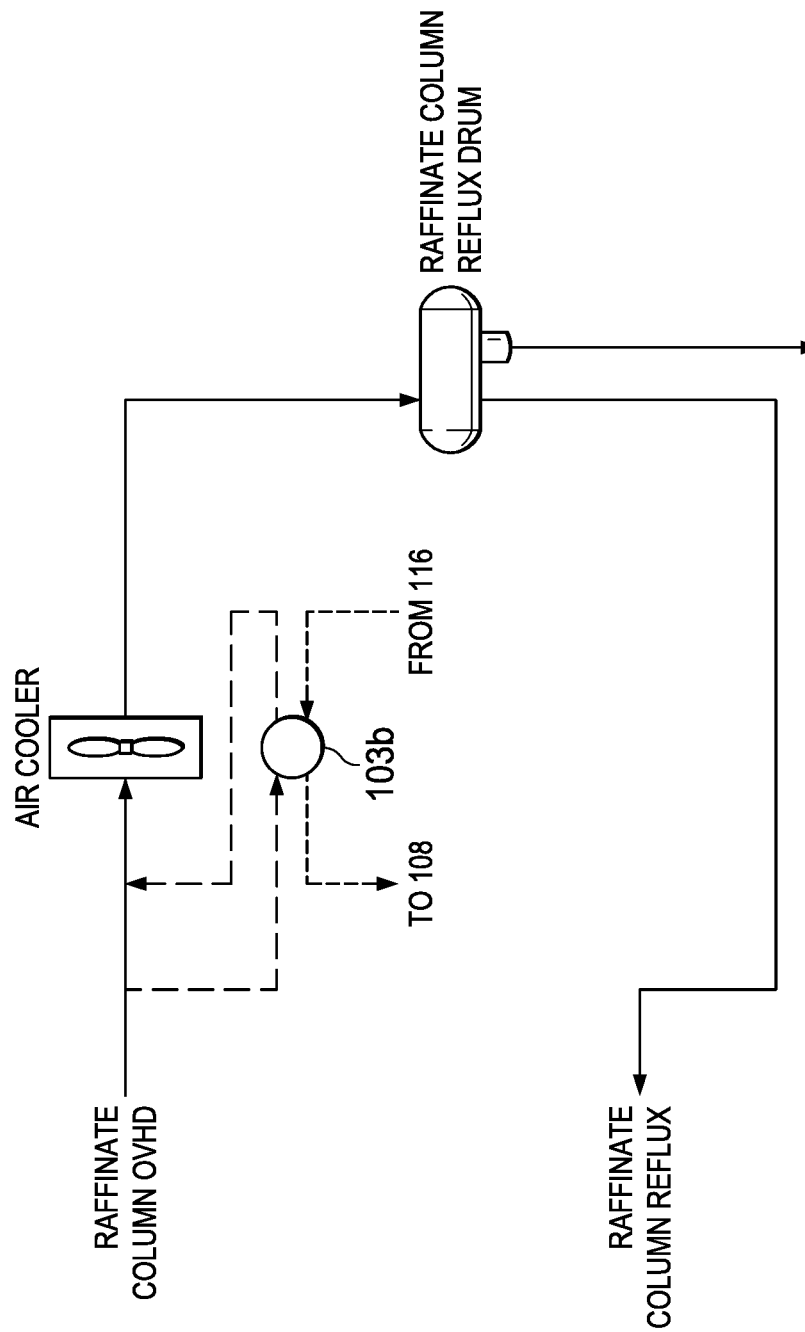

FIG. 1L shows the second heat exchanger 103b in the second heating fluid circuit 103 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from the heavy Raffinate column overhead and the heating fluid flow through the second heat exchanger 103b simultaneously. The second heat exchanger 103b cools down the stream from a greater temperature, for example, about 162° C., to a lesser temperature, for example, about 130° C., and increases the temperature of the heating fluid from a lesser temperature, for example, about 105° C., to a greater temperature, for example, about 157° C. The thermal duty of the second heat exchanger 103b to implement the heat exchange is about 91 MW. The heating fluid at about 157° C. that exits the second heat exchanger 103b is circulated to a main heater to be mixed with the heated heating fluids from the other seven heat exchangers in the second heating fluid circuit 103.

Figure 1M:
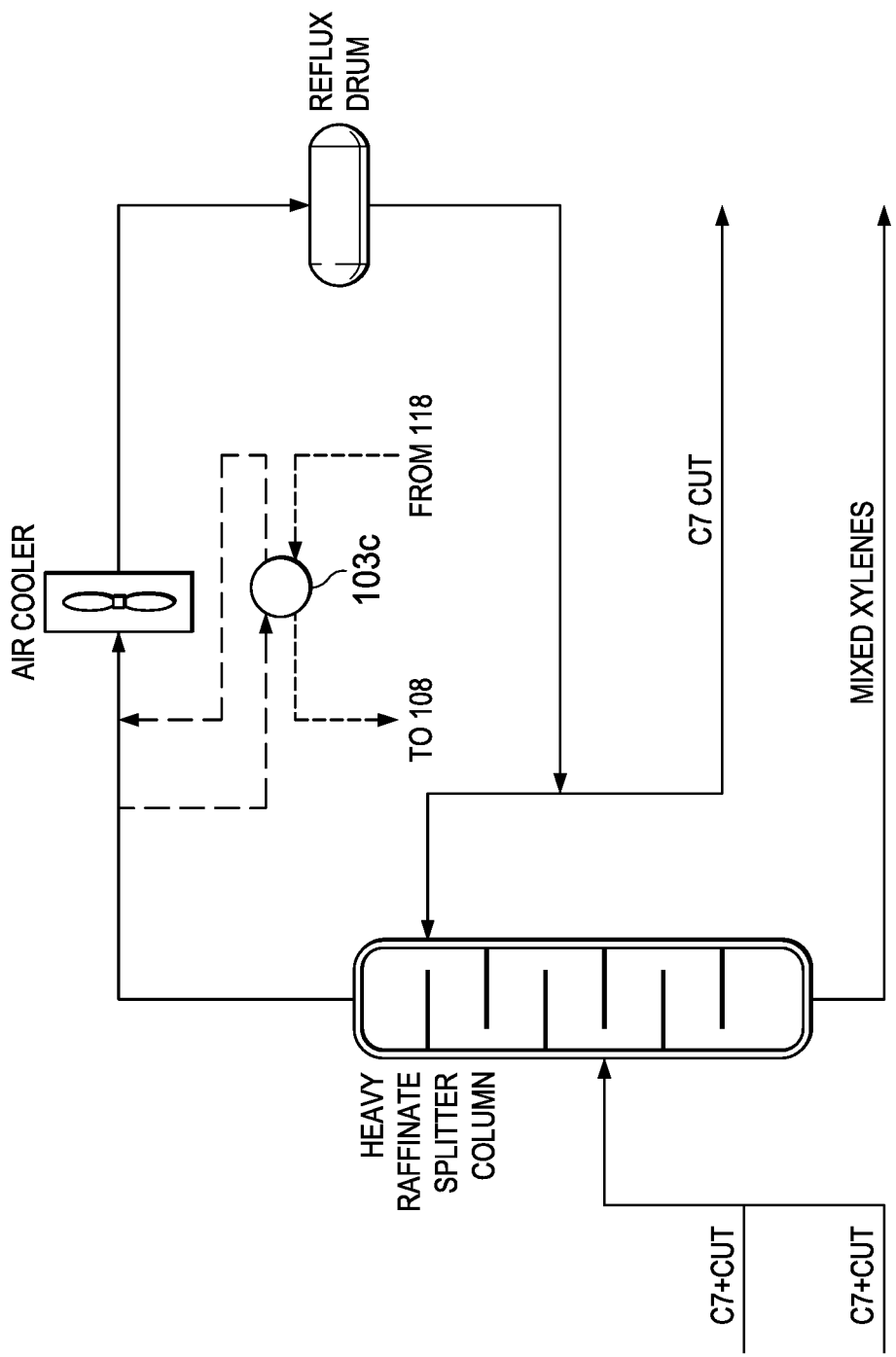
Figure 1N:
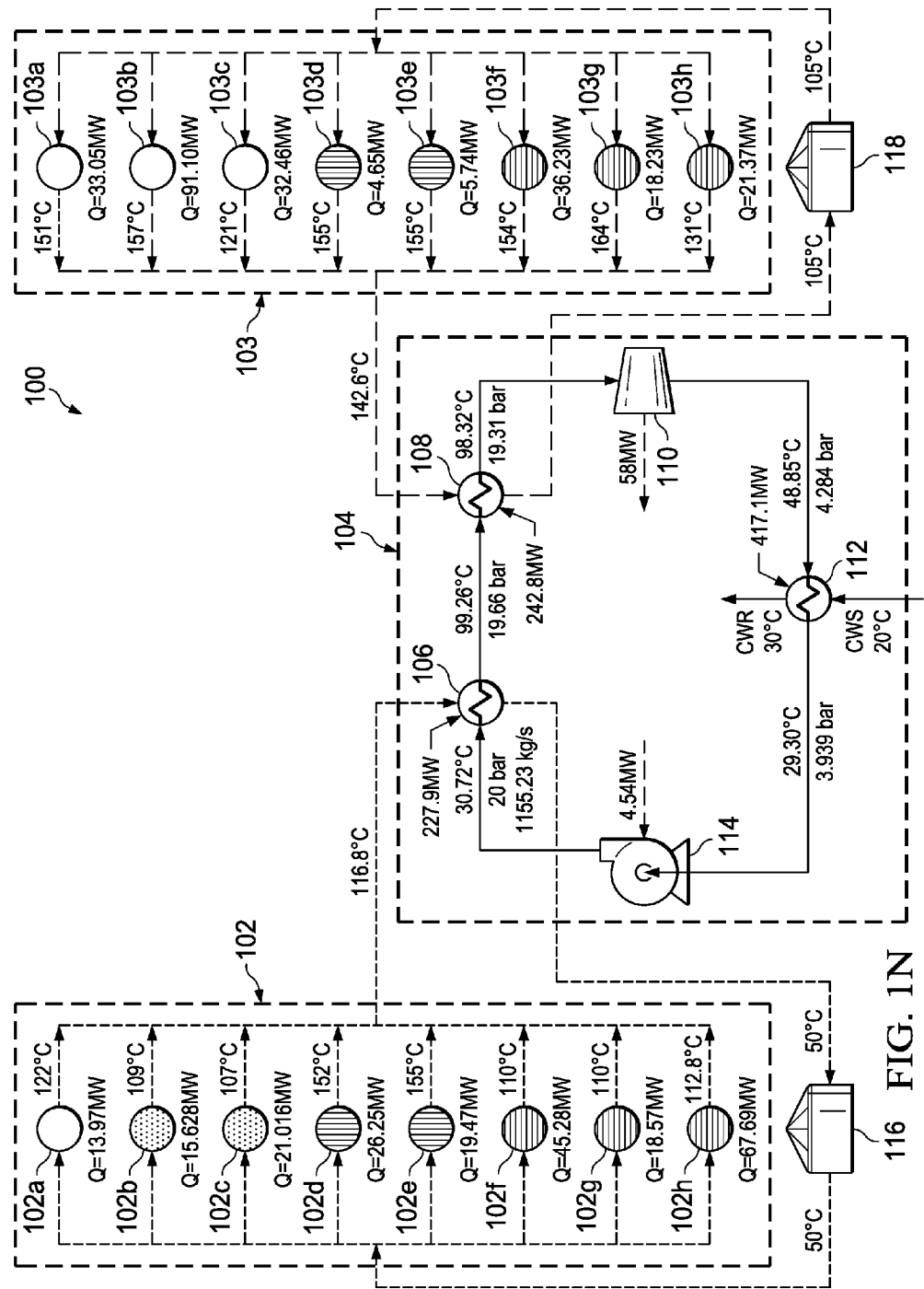
FIG. 1N is a schematic diagram of an implementation of the example network of FIG. 1A.

FIG. 1M shows the third heat exchanger 103c in the second heating fluid circuit 103 in the aromatics plant of the petrochemical refining system. The aromatics plant can include a para-Xylene separation section, a para-Xylene isomerization reaction section and a para-Xylene separation section, a Xylene isomerization de-heptanizer and a heavy Raffinate column splitter among other sections. A stream from the heavy Raffinate column overhead and the heating fluid flow through the third heat exchanger 103c simultaneously. The third heat exchanger 103c cools down the stream from a greater temperature, for example, about 126° C., to a lesser temperature, for example, about 113° C., and increases the temperature of the heating fluid from a lesser temperature, for example, about 105° C., to a greater temperature, for example, about 121° C. The thermal duty of the third heat exchanger 103c to implement the heat exchange is about 33 MW. The heating fluid at about 121° C. that exits the third heat exchanger 103c is circulated to a main heater to be mixed with the heated heating fluids from the other seven heat exchangers in the second heating fluid circuit 103.

FIG. 1N is a schematic diagram of an implementation of the example network of FIG. 1A. The heating fluids received from the eight heat exchangers in the first heating circuit are mixed in the main header resulting in a heating fluid at a temperature of about 117° C. The heated heating fluid from the first heating fluid circuit 102 is circulated through the pre-heater 106 of the ORC. The heating fluids received from the eight heat exchangers in the second heating circuit are mixed in the main header resulting in a heating fluid at a temperature of about 143° C. The heated heating fluid from the second heating fluid circuit 103 is circulated through the evaporator 108 of the ORC. In some implementations, the pre-heater 106 and the evaporator 108 increase the temperature of the working fluid (for example, isobutane or other working fluid) from about 31° C. at about 20 bar to about 98° C. at about 20 bar at a thermal duty of about 228 MW and 243 MW, respectively. The gas expander 110 expands the high temperature, high pressure working fluid to generate power, for example, about 58 MW, at an efficiency of about 85%. The expansion decreases the temperature and pressure of the working fluid, for example, to about 49° C. and about 4.3 bar, respectively. The working fluid flows through the condenser 112 which further decreases the temperature and pressure of the working fluid at a thermal duty of about 417 MW. For example, cooling fluid flows through the condenser 112 at a lesser temperature, for example, about 20° C., exchanges heat with the working fluid, and exits the condenser 112 at a greater temperature, for example, about 30° C. The cooled working fluid (for example, isobutane liquid) is pumped by the pump 114 at an efficiency, for example, of about 75%, and an input power, for example, of about 5 MW. The pump 114 increases the temperature of the working fluid to about 31° C. and pumps the working fluid at a mass flow rate of about 1155 kg/s to the pre-heater 106, which repeats the Rankine cycle to generate power.

Figure 1O:
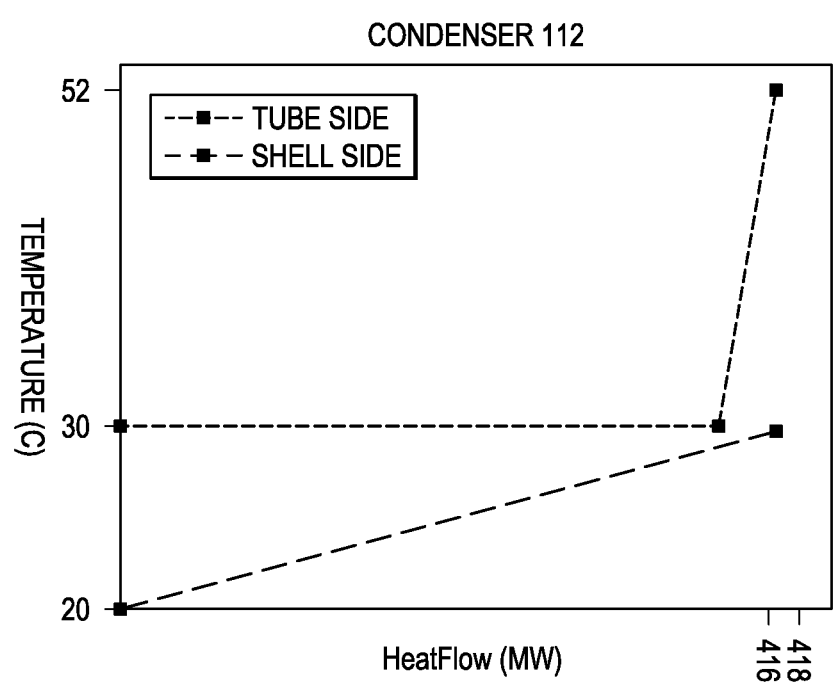
FIG. 1O is a graph that shows a tube side fluid temperature and a shell side fluid temperature in the condenser during an operation of the system of FIG. 1A.

FIG. 1O is a graph that shows a tube side fluid temperature (for example, a cooling, or condenser, fluid flow) and a shell side fluid temperature (for example, an ORC working fluid flow) in the condenser 112 during an operation of the system 100. This graph shows a temperature difference between the fluids on the y-axis relative to a heat flow between the fluids on the x-axis. For example, as shown in this figure, as the temperature difference between the fluids decreases, a heat flow between the fluids can increase. In some aspects, the cooling fluid medium may be at or about 20° C. or even greater. In such cases, a gas expander outlet pressure (for example, pressure of the ORC working fluid exiting the gas expander) may be high enough to allow the condensation of the ORC working fluid at the available cooling fluid temperature. As shown in FIG. 1O, the condenser water (entering the tubes of the condenser 112) enters at about 20° C. and leaves at about 25-27° C. The ORC working fluid (entering the shell-side of the condenser) enters as a vapor at about 49° C., and then condenses at 30° C. and leaves the condensers as a liquid at 30° C.

Figure 1P:
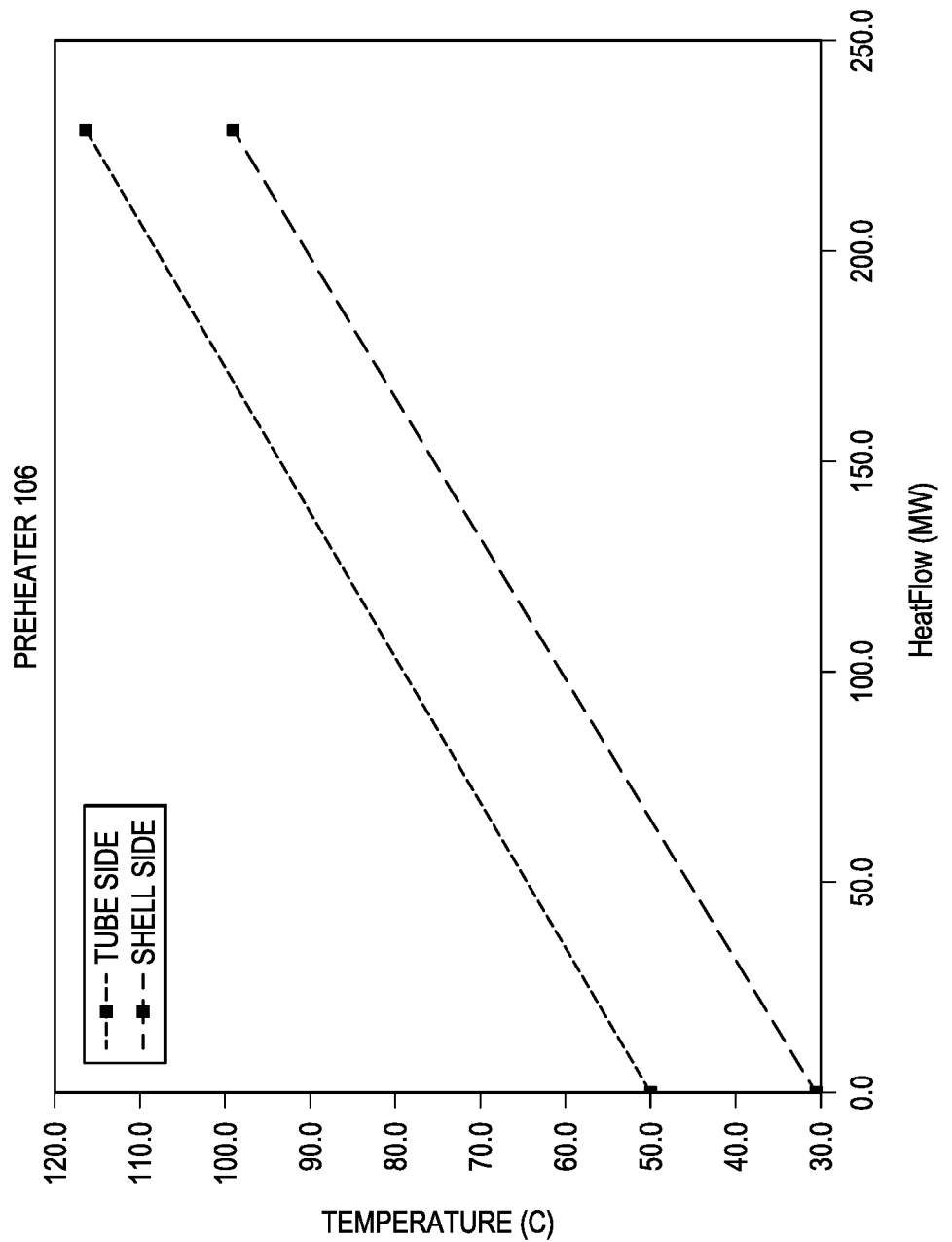
FIG. 1P is a graph that shows a tube side fluid temperature and a shell side fluid temperature in the preheater during an operation of the system of FIG. 1A.

FIG. 1P is a graph that show a tube-side fluid temperature (for example, a heating fluid flow) and a shell-side fluid temperature (for example, an ORC working fluid flow) in the pre-heater 106 during an operation of the system 100. This graph shows a temperature difference between the fluids on the y-axis relative to a heat flow between the fluids on the x-axis. For example, as shown in this figure, as the temperature difference between the fluids decreases, a heat flow between the fluids can increase. This graph shows a temperature difference between the fluids on the y-axis relative to a heat flow between the fluids on the x-axis. For example, as shown in FIG. 1P, as the tube-side fluid (for example, the hot oil or water in the heating fluid circuit 102) is circulated through the pre-heater 106, heat is transferred from that fluid to the shell-side fluid (for example, the ORC working fluid). Thus, the tube-side fluid enters the pre-heater 106 at about 116° C. and leaves the pre-heater 106 at about 50° C. The shell-side fluid enters the pre-heater 106 at about 30° C. (for example, as a liquid) and leaves the pre-heater 106 at about 99° C. (for example, also as a liquid or mixed phase fluid).

Figure 1Q:
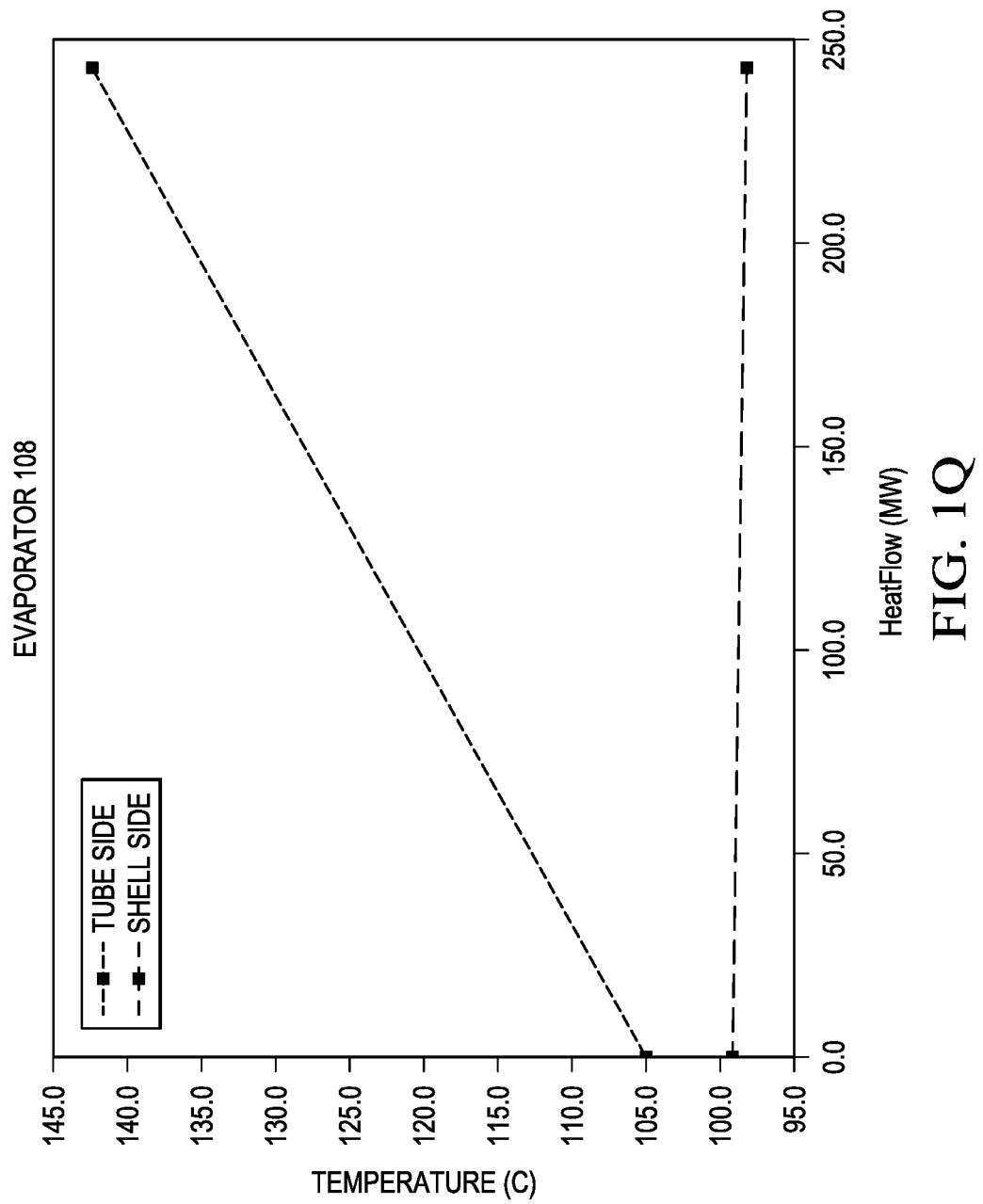
FIG. 1Q is a graph that shows a tube side fluid temperature and a shell side fluid temperature in the evaporator during an operation of the system of FIG. 1A.

FIG. 1Q is a graph that shows a tube side fluid temperature (for example, a heating fluid flow) and a shell side fluid temperature (for example, an ORC working fluid flow) in the evaporator 108 during an operation of the system 100. This graph shows a temperature difference between the fluids on the y-axis relative to a heat flow between the fluids on the x-axis. For example, as shown in this figure, as the temperature difference between the fluids increases, a heat flow between the fluids can increase. For example, as shown in FIG. 1Q, as the tube-side fluid (for example, the hot oil or water in the heating fluid circuit 103) is circulated through the evaporator 108, heat is transferred from that fluid to the shell-side fluid (for example, the ORC working fluid). Thus, the tube-side fluid enters the evaporator 108 at about 142° C. and leaves the evaporator 108 at about 105° C. The shell-side fluid enters the evaporator 108, from the pre-heater 106, at about 99° C. (for example, as a liquid or mixed phase fluid) and leaves the evaporator 108 also at about 99° C. (for example, as a vapor with some superheating).

The techniques to recover heat energy generated by a petrochemical refining system described earlier can be implemented in at least one or both of two example scenarios. In the first scenario, the techniques can be implemented in a petrochemical refining system that is to be constructed. For example, a geographic layout to arrange multiple sub-units of a petrochemical refining system can be identified. The geographic layout can include multiple sub-unit locations at which respective sub-units are to be positioned. Identifying the geographic layout can include actively determining or calculating the location of each sub-unit in the petrochemical refining system based on particular technical data, for example, a flow of petrochemicals through the sub-units starting from crude petroleum and resulting in refined petroleum. Identifying the geographic layout can alternatively or in addition include selecting a layout from among multiple previously-generated geographic layouts. A first subset of sub-units of the petrochemical refining system can be identified. The first subset can include at least two (or more than two) heat-generating sub-units from which heat energy is recoverable to generate electrical power. In the geographic layout, a second subset of the multiple sub-unit locations can be identified. The second subset includes at least two sub-unit locations at which the respective sub-units in the first subset are to be positioned. A power generation system to recover heat energy from the sub-units in the first subset is identified. The power generation system can be substantially similar to the power generation system described earlier. In the geographic layout, a power generation system location can be identified to position the power generation system. At the identified power generation system location, a heat energy recovery efficiency is greater than a heat energy recovery efficiency at other locations in the geographic layout. The petrochemical refining system planners and constructors can perform modeling or computer-based simulation experiments (or both) to identify an optimal location for the power generation system to maximize heat energy recovery efficiency, for example, by minimizing heat loss when transmitting recovered heat energy from the at least two heat-generating sub-units to the power generation system. The petrochemical refining system can be constructed according to the geographic layout by positioning the multiple sub-units at the multiple sub-unit locations, positioning the power generation system at the power generation system location, interconnecting the multiple sub-units with each other such that the interconnected multiple sub-units are configured to refine petrochemicals, and interconnecting the power generation system with the sub-units in the first subset such that the power generation system is configured to recover heat energy from the sub-units in the first subset and to provide the recovered heat energy to the power generation system. The power generation system is configured to generate power using the recovered heat energy.

In the second scenario, the techniques can be implemented in an operational petrochemical refining system. In other words, the power generation system described earlier can be retrofitted to an already constructed and operational petrochemical refining system.

Implementations of the subject matter described here can increase an energy output of petrochemical refining systems by about 37 MW for local utilization or export to an electricity grid. In this manner, the carbon consumption and GHG emissions of the plant can be decreased.

Thus, particular implementations of the subject matter have been described. Other implementations are within the scope of the following claims.

What is claimed is:

1. A power generation system comprising:
a first heating fluid circuit thermally coupled to a plurality of heat sources from a plurality of sub-units of a petrochemical refining system;
a second heating fluid circuit thermally coupled to the plurality of heat sources from the plurality of sub-units of the petrochemical refining system, wherein the plurality of sub-units comprises a hydrocracking plant and an aromatics plant,
wherein a first subset of the plurality of heat sources comprises a plurality of hydrocracking plant heat exchangers coupled to streams in the hydrocracking plant, and
wherein a second subset of the plurality of heat sources comprises a plurality of aromatics plant heat exchangers coupled to streams in the aromatics plant;
a power generation system that comprises an organic Rankine cycle (ORC), the ORC comprising (i) a working fluid that is thermally coupled to the first heating fluid circuit and the second heating fluid circuit to heat the working fluid, and (ii) an expander configured to generate electrical power from the heated first working fluid; and
a control system configured to activate a set of control valves to selectively thermally couple each of the first heating fluid circuit and the second heating fluid circuit to at least a portion of the plurality of heat sources.

2. The system of claim 1, wherein the working fluid is thermally coupled to the first heating fluid circuit in a pre-heater of the ORC and to the second heating fluid circuit in an evaporator of the ORC.

3. The system of claim 2, wherein the working fluid comprises isobutane.

4. The system of claim 1, wherein the first heating fluid circuit comprises a first heating fluid tank that is fluidly coupled to the first heating fluid circuit, and wherein the second heating fluid circuit comprises a second heating fluid tank that is fluidly coupled to the second heating fluid circuit.

5. The system of claim 1, wherein the plurality of heat sources in the first heating fluid circuit are fluidly coupled in parallel, and wherein the plurality of heat sources in the second heating fluid circuit are fluidly coupled in parallel.

6. The system of claim 1, wherein:
each hydrocracking plant heat exchanger comprises a respective stream circulated through the hydrocracking plant and a portion of the heating fluid, and
each aromatics plant heat exchanger comprises a respective stream circulated through the aromatics plant and a portion of the heating fluid.

7. The system of claim 6, wherein:
the aromatics plant comprises a para-Xylene separation unit, and wherein a first aromatics plant heat exchanger in the first heating fluid circuit exchanges heat between a para-Xylene purification column overhead stream in the para-Xylene separation unit and a portion of the heating fluid,
the aromatics plant comprises a para-Xylene isomerization reactor, and wherein a second aromatics plant heat exchanger in the first heating fluid circuit exchanges heat between a Xylene isomerization reactor outlet stream in the para-Xylene isomerization reactor and a portion of the heating fluid,
the aromatics plant comprises a Xylene isomerization de-heptanizer, and wherein a third aromatics plant heat exchanger in the first heating fluid circuit exchanges heat between a Xylene isomerization de-heptanizer column overhead stream in the Xylene isomerization de-heptanizer and a portion of the heating fluid,
a fourth hydrocracking plant heat exchanger in the first heating fluid circuit exchanges heat between a $2^{nd}$ stage reaction section feed stream to $2^{nd}$ stage cold high pressure separator and a portion of the heating fluid, and
a fifth hydrocracking plant heat exchanger in the first heating fluid circuit exchanges heat between a hydrocracking main fractionator kerosene product and a portion of the heating fluid.

8. The system claim 7, wherein:
a first aromatics plant heat exchanger in the second heating fluid circuit exchanges heat between an extract column overhead stream in the para-Xylene separation unit and a portion of the heating fluid,
a second aromatics plant heat exchanger in the second heating fluid circuit exchanges heat between a heavy Raffinate splitter column overhead stream in a Raffinate column splitter and a portion of the heating fluid,
a third aromatics plant heat exchanger in the second heating fluid circuit exchanges heat between a para-Xylene purification column overhead stream in the para-Xylene separation unit and a portion of the heating fluid,
a fourth hydrocracking plant heat exchanger in the second heating fluid circuit exchanges heat between a hydrocracking main fractionator kerosene pumparound and a portion of the heating fluid, and
a fifth hydrocracking plant heat exchanger in the second heating fluid circuit exchanges heat between a hydrocracking main fractionator diesel product and a portion of the heating fluid.

9. The system of claim 8, wherein:
a sixth hydrocracking plant heat exchanger in the first heating fluid circuit is connected in series with a sixth hydrocracking plant heat exchanger in the second heating fluid circuit, and
the sixth hydrocracking plant heat exchanger in the first heating fluid circuit and the sixth hydrocracking plant heat exchanger in the second heating fluid circuit exchange heat between a $1^{st}$ stage reaction section feed stream to $1^{st}$ stage cold high pressure separator and a portion of the heating fluid.

10. The system of claim 8, wherein:
a seventh hydrocracking plant heat exchanger in the first heating fluid circuit is connected in series with a seventh hydrocracking plant heat exchanger in the second heating fluid circuit, and
the seventh hydrocracking plant heat exchanger in the first heating fluid circuit and the seventh hydrocracking plant heat exchanger in the second heating fluid circuit exchange heat between a hydrocracking product stripper overhead stream and a portion of the heating fluid.

11. The system of claim 8, wherein:
an eighth hydrocracking plant heat exchanger in the first heating fluid circuit is connected in series with an eighth hydrocracking plant heat exchanger in the second heating fluid circuit, and
the eighth hydrocracking plant heat exchanger in the first heating fluid circuit and the eighth hydrocracking plant heat exchanger in the second heating fluid circuit exchange heat between a hydrocracking main fractionator overhead stream and a portion of the heating fluid.

12. The system of claim 1, wherein the heating fluid circuit comprises water or oil.

13. The system of claim 1, wherein the power generation system is on-site at the petrochemical refining system.

14. The system of claim 1, wherein the power generation system is configured to generate about 58 MW of power.

15. A method of recovering heat energy generated by a petrochemical refining system, the method comprising:
identifying a geographic layout to arrange a plurality of sub-units of a petrochemical refining system, the geographic layout including a plurality of sub-unit locations at which the respective plurality of sub-units are to be positioned, wherein the plurality of sub-units comprises a hydrocracking plant and an aromatics plant;
identifying a first subset of the plurality of sub-units of the petrochemical refining system, the first subset including a plurality of hydrocracking plant heat exchangers coupled to streams in the hydrocracking plant and a plurality of aromatics plant heat exchangers coupled to streams in the aromatics plant, wherein heat energy is recoverable from the first subset to generate electrical power;
identifying, in the geographic layout, a second subset of the plurality of sub-unit locations, the second subset including sub-unit locations at which the respective sub-units in the first subset are to be positioned;
identifying a power generation system to recover heat energy from the sub-units in the first subset, the power generation system comprising:
a first heating fluid circuit and a second heating fluid circuit, each heating fluid circuit fluidly connected to the sub-units in the first subset;
a power generation system that comprises an organic Rankine cycle (ORC), the ORC comprising (i) a working fluid that is thermally coupled to the first heating fluid circuit and the second heating fluid circuit to heat the working fluid, and (ii) an expander configured to generate electrical power from the heated first working fluid; and
a control system configured to activate a set of control valves to selectively thermally couple each of the first heating fluid circuit and the second heating fluid circuit to at least a portion of the plurality of heat sources; and
identifying, in the geographic layout, a power generation system location to position the power generation system, wherein a heat energy recovery efficiency at the power generation system location is greater than a heat energy recovery efficiency at other locations in the geographic layout.

16. The method of claim 15, further comprising constructing the petrochemical refining system according to the geographic layout by positioning the plurality of sub-units at the plurality of sub-unit locations, positioning the power generation system at the power generation system location, interconnecting the plurality of sub-units with each other such that the interconnected plurality of sub-units are configured to refine petrochemicals, and interconnecting the power generation system with the sub-units in the first subset such that the power generation system is configured to recover heat energy from the sub-units in the first subset and to provide the recovered heat energy to the power generation system, the power generation system configured to generate power using the recovered heat energy.

17. The method of claim 16, further comprising:
operating the petrochemical refining system to refine petrochemicals; and
operating the power generation system to:
recover heat energy from the sub-units in the first subset through the first heating fluid circuit and the second heating fluid circuit;
provide the recovered heat energy to the power generation system; and
generate power using the recovered heat energy.

18. The method of claim 17, further comprising thermally coupling the working fluid to the first heating fluid circuit in a pre-heater of the ORC and thermally coupling the working fluid to the second heating fluid circuit in an evaporator of the ORC.

19. The method of claim 17, wherein each hydrocracking plant heat exchanger comprises a respective stream circulated through the hydrocracking plant and a portion of the heating fluid, and wherein operating the power generation system to recover heat energy from the sub-units in the first subset through the first heating fluid circuit and the second heating fluid circuit comprises:
operating a first aromatics plant heat exchanger in the first heating fluid circuit to exchange heat between a para-Xylene purification column overhead stream in a para-Xylene separation unit in the aromatics plant and a portion of the heating fluid,
operating a second aromatics plant heat exchanger in the first heating fluid circuit to exchange heat between a Xylene isomerization reactor outlet stream in a para-Xylene isomerization reactor in the aromatics plant and a portion of the heating fluid,
operating a third aromatics plant heat exchanger in the first heating fluid circuit to exchange heat between a Xylene isomerization de-heptanizer column overhead stream in a Xylene isomerization de-heptanizer in the aromatics plant and a portion of the heating fluid,
operating a fourth hydrocracking plant heat exchanger in the first heating fluid circuit to exchange heat between a $2^{nd}$ stage reaction section feed stream to $2^{nd}$ stage cold high pressure separator in the hydrocracking plant and a portion of the heating fluid, and
operating a fifth hydrocracking plant heat exchanger in the first heating fluid circuit to exchange heat between a hydrocracking main fractionator kerosene product in the hydrocracking plant and a portion of the heating fluid.

20. The method of claim 19, wherein each aromatics plant heat exchanger comprises a respective stream circulated through the aromatics plant and a portion of the heating fluid, and wherein operating the power generation system to recover heat energy from the sub-units in the first subset through the first heating fluid circuit and the second heating fluid circuit comprises:
operating a first aromatics plant heat exchanger in the second heating fluid circuit to exchanges heat between an extract column overhead stream in the para-Xylene separation unit and a portion of the heating fluid,
operating a second aromatics plant heat exchanger in the second heating fluid circuit to exchange heat between a heavy Raffinate splitter column overhead stream in a Raffinate column splitter and a portion of the heating fluid,
operating a third aromatics plant heat exchanger in the second heating fluid circuit to exchange heat between a para-Xylene purification column overhead stream in the para-Xylene separation unit and a portion of the heating fluid,
operating a fourth hydrocracking plant heat exchanger in the second heating fluid circuit to exchange heat between a hydrocracking main fractionator kerosene pumparound and a portion of the heating fluid, and
operating a fifth hydrocracking plant heat exchanger in the second heating fluid circuit to exchange heat between a hydrocracking main fractionator diesel product and a portion of the heating fluid.

21. The method of claim 20, wherein:
a sixth hydrocracking plant heat exchanger in the first heating fluid circuit is connected in series with a sixth hydrocracking plant heat exchanger in the second heating fluid circuit, and
wherein the method further comprises operating the sixth hydrocracking plant heat exchanger in the first heating fluid circuit and the sixth hydrocracking plant heat exchanger in the second heating fluid circuit to exchange heat between a $1^{st}$ stage reaction section feed stream to $1^{st}$ stage cold high pressure separator and a portion of the heating fluid.

22. The method of claim 20, wherein:
a seventh hydrocracking plant heat exchanger in the first heating fluid circuit is connected in series with a seventh hydrocracking plant heat exchanger in the second heating fluid circuit, and
wherein the method further comprises operating the seventh hydrocracking plant heat exchanger in the first heating fluid circuit and the seventh hydrocracking plant heat exchanger in the second heating fluid circuit to exchange heat between a hydrocracking product stripper overhead stream and a portion of the heating fluid.

23. The method of claim 20, wherein:
an eighth hydrocracking plant heat exchanger in the first heating fluid circuit is connected in series with an eighth hydrocracking plant heat exchanger in the second heating fluid circuit, and
wherein the method further comprises operating the eighth hydrocracking plant heat exchanger in the first heating fluid circuit and the eighth hydrocracking plant heat exchanger in the second heating fluid circuit to exchange heat between a hydrocracking main fractionator overhead stream and a portion of the heating fluid.

24. The method of claim 15, further comprising operating the power generation system to generate about 58 MW of power.

25. A method of re-using heat energy generated by an operational petrochemical refining system, the method comprising:

identifying a geographic layout that comprises an arrangement of a plurality of sub-units of an operational petrochemical refining system, the geographic layout including a plurality of sub-units, each positioned at a respective sub-unit location;

identifying a first subset of the plurality of sub-units of the petrochemical refining system, the first subset including a plurality of hydrocracking plant heat exchangers coupled to streams in the hydrocracking plant and a plurality of aromatics plant heat exchangers coupled to streams in the aromatics plant, wherein heat energy is recoverable from the first subset to generate electrical power;

identifying, in the geographic layout, a second subset of the plurality of sub-unit locations, the second subset including sub-unit locations at which the respective sub-units in the first subset have been positioned;

identifying a power generation system to recover heat energy from the sub-units in the first subset, the power generation system comprising:

a first heating fluid circuit and a second heating fluid circuit, each heating fluid circuit fluidly connected to the sub-units in the first subset;

a power generation system that comprises an organic Rankine cycle (ORC), the ORC comprising (i) a working fluid that is thermally coupled to the first heating fluid circuit and the second heating fluid circuit to heat the working fluid, and (ii) an expander configured to generate electrical power from the heated first working fluid; and a control system configured to activate a set of control valves to selectively thermally couple each of the first heating fluid circuit and the second heating fluid circuit to at least a portion of the plurality of heat sources; and identifying a power generation system location in the operational petrochemical refining system to position the power generation system, wherein a heat energy recovery efficiency at the power generation system location is greater than a heat energy recovery efficiency at other locations in the operational petrochemical refining system.

26. The method of claim 25, further comprising interconnecting the power generation system with the sub-units in the first subset through the first heating fluid circuit and the second heating fluid circuit such that the power generation system is configured to recover heat energy from the sub-units in the first subset and to provide the recovered heat energy to the power generation system, the power generation system configured to generate power using the recovered heat energy.

27. The method of 26, further comprising operating the power generation system to:

recover heat energy from the sub-units in the first subset through the first heating fluid circuit and the second heating fluid circuit;

provide the recovered heat energy to the power generation system; and generate power using the recovered heat energy.

28. The method of claim 25, wherein each hydrocracking plant heat exchanger comprises a respective stream circulated through the hydrocracking plant and a portion of the heating fluid, and wherein operating the power generation system to recover heat energy from the sub-units in the first subset through the first heating fluid circuit and the second heating fluid circuit comprises:

operating a first aromatics plant heat exchanger in the first heating fluid circuit to exchange heat between a para-Xylene purification column overhead stream in a para-Xylene separation unit in the aromatics plant and a portion of the heating fluid, operating a second aromatics plant heat exchanger in the first heating fluid circuit to exchange heat between a Xylene isomerization reactor outlet stream in a para-Xylene isomerization reactor in the aromatics plant and a portion of the heating fluid, operating a third aromatics plant heat exchanger in the first heating fluid circuit to exchange heat between a Xylene isomerization de-heptanizer column overhead stream in a Xylene isomerization de-heptanizer in the aromatics plant and a portion of the heating fluid, operating a fourth hydrocracking plant heat exchanger in the first heating fluid circuit to exchange heat between a $2^{nd}$ stage reaction section feed stream to $2^{nd}$ stage cold high pressure separator in the hydrocracking plant and a portion of the heating fluid, and operating a fifth hydrocracking plant heat exchanger in the first heating fluid circuit to exchange heat between a hydrocracking main fractionator kerosene product in the hydrocracking plant and a portion of the heating fluid.

29. The method of claim 28, wherein each aromatics plant heat exchanger comprises a respective stream circulated through the aromatics plant and a portion of the heating fluid, and wherein operating the power generation system to recover heat energy from the sub-units in the first subset through the first heating fluid circuit and the second heating fluid circuit comprises:

operating a first aromatics plant heat exchanger in the second heating fluid circuit to exchanges heat between an extract column overhead stream in the para-Xylene separation unit and a portion of the heating fluid, operating a second aromatics plant heat exchanger in the second heating fluid circuit to exchange heat between a heavy Raffinate splitter column overhead stream in a Raffinate column splitter and a portion of the heating fluid, operating a third aromatics plant heat exchanger in the second heating fluid circuit to exchange heat between a para-Xylene purification column overhead stream in the para-Xylene separation unit and a portion of the heating fluid, operating a fourth hydrocracking plant heat exchanger in the second heating fluid circuit to exchange heat between a hydrocracking main fractionator kerosene pumparound and a portion of the heating fluid, and operating a fifth hydrocracking plant heat exchanger in the second heating fluid circuit to exchange heat between a hydrocracking main fractionator diesel product and a portion of the heating fluid.

30. The method of claim 29, wherein a sixth hydrocracking plant heat exchanger in the first heating fluid circuit is connected in series with a sixth hydrocracking plant heat exchanger in the second heating fluid circuit, a seventh hydrocracking plant heat exchanger in the first heating fluid circuit is connected in series with a seventh hydrocracking plant heat exchanger in the second heating fluid circuit, and an eighth hydrocracking plant heat exchanger in the first heating fluid circuit is connected in series with an eighth hydrocracking plant heat exchanger in the second heating fluid circuit, and wherein the method further comprises:

operating the sixth hydrocracking plant heat exchanger in the first heating fluid circuit and the sixth hydrocracking plant heat exchanger in the second heating fluid circuit to exchange heat between a $1^{st}$ stage reaction section feed stream to $1^{st}$ stage cold high pressure separator and a portion of the heating fluid, operating the seventh hydrocracking plant heat exchanger in the first heating fluid circuit and the seventh hydrocracking plant heat exchanger in the second heating fluid circuit to exchange heat between a hydrocracking product stripper overhead stream and a portion of the heating fluid, and operating the eighth hydrocracking plant heat exchanger in the first heating fluid circuit and the eighth hydrocracking plant heat exchanger in the second heating fluid circuit to exchange heat between a hydrocracking main fractionator overhead stream and a portion of the heating fluid.

31. The method of claim 25, further comprising operating the power generation system to generate about 40 MW of power.

\* \* \* \* \*